(12) United States Patent
Noda et al.

(10) Patent No.: US 7,023,592 B2
(45) Date of Patent: Apr. 4, 2006

(54) BAND-PASS FILTER AND IMAGE DISPLAY APPARATUS

(75) Inventors: Tetsuya Noda, Tenri (JP); Yasushi Tanijiri, Osakasayama (JP); Takeshi Endo, Osaka (JP); Hiroaki Ueda, Suita (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/294,157

(22) Filed: Nov. 14, 2002

(65) Prior Publication Data

US 2003/0099009 A1    May 29, 2003

(30) Foreign Application Priority Data

Nov. 26, 2001   (JP) .............................. 2001-359069

(51) Int. Cl.
*G02B 5/32* (2006.01)
(52) U.S. Cl. .............................. 359/15; 359/589; 359/1

(58) Field of Classification Search .................... 359/1, 359/13–15, 589
See application file for complete search history.

(56) References Cited

U.S. PATENT DOCUMENTS

| 3,940,203 A | | 2/1976 | La Russa ..................... 350/3.5 |
| 4,407,564 A | * | 10/1983 | Ellis ............................... 345/7 |
| 4,830,464 A | | 5/1989 | Cheysson et al. ........... 350/174 |
| 4,874,214 A | | 10/1989 | Cheysson et al. ............ 350/3.7 |
| 5,071,564 A | * | 12/1991 | Stein et al. .................. 210/680 |
| 2002/0001110 A1 | * | 1/2002 | Metz et al. .................... 359/10 |

FOREIGN PATENT DOCUMENTS

EP      0 943 934 A2    9/1999

* cited by examiner

*Primary Examiner*—Leonidas Boutsikaris
(74) *Attorney, Agent, or Firm*—Sidley Austin Brown & Wood LLP

(57) ABSTRACT

A band-pass filter has a reflecting optical element having a fixed reflection angle selection region for wavelengths of a given region, and has an optical path such that reflection is performed at least once and transmission is performed at least once at the reflecting optical element.

10 Claims, 19 Drawing Sheets

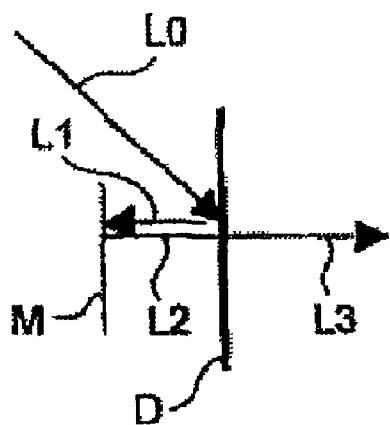
FIG. 1
FIG. 2A
FIG. 2B
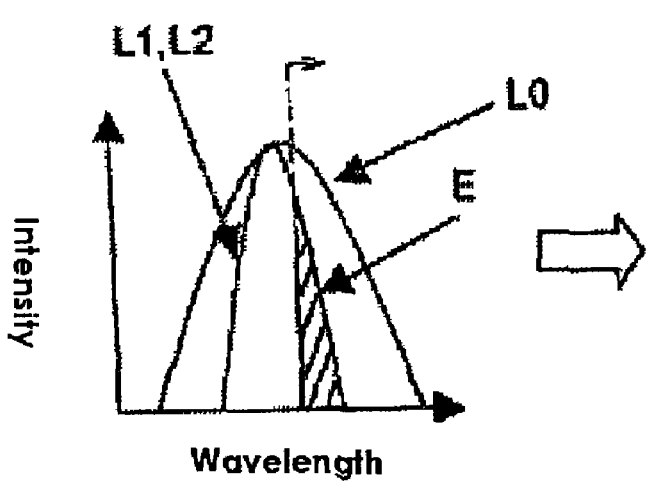
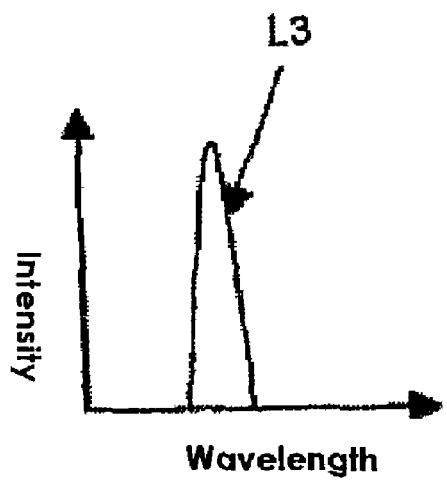
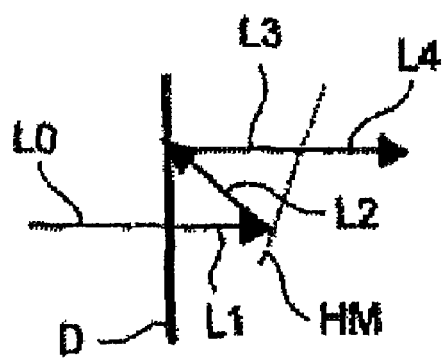
FIG. 3

FIG. 16A
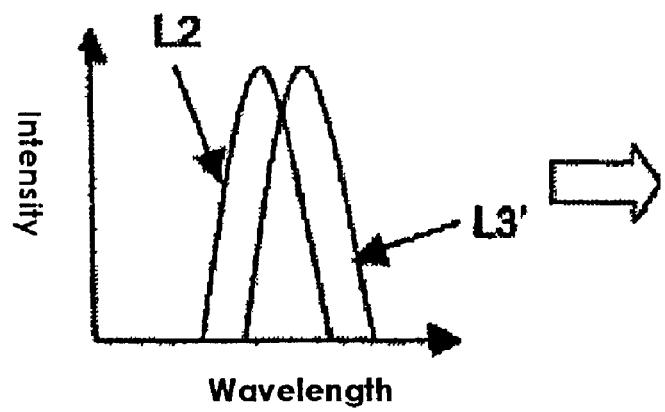
FIG. 16B
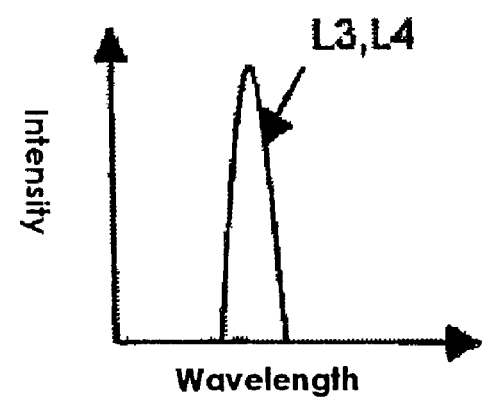
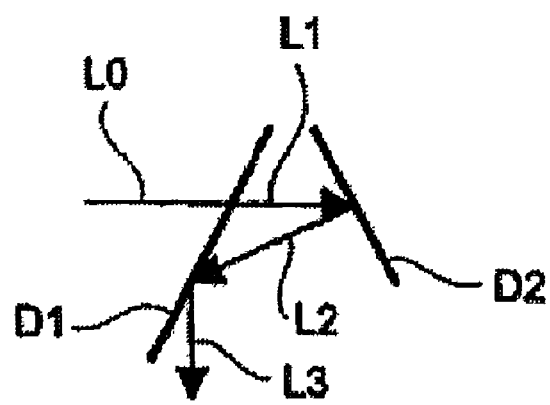
FIG. 17
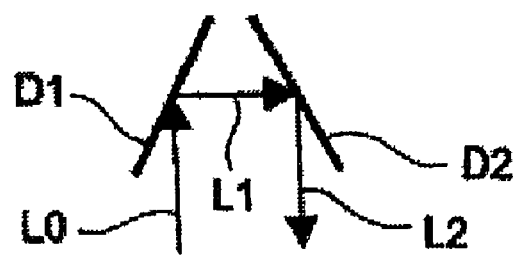
FIG. 18

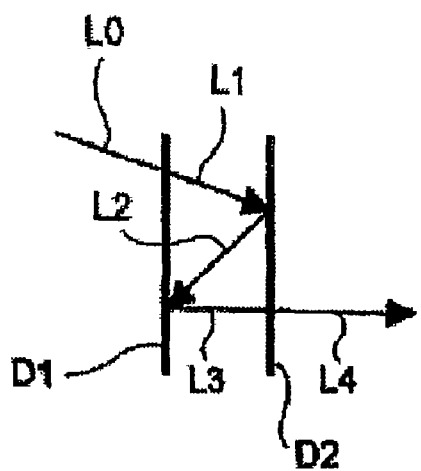
FIG. 19
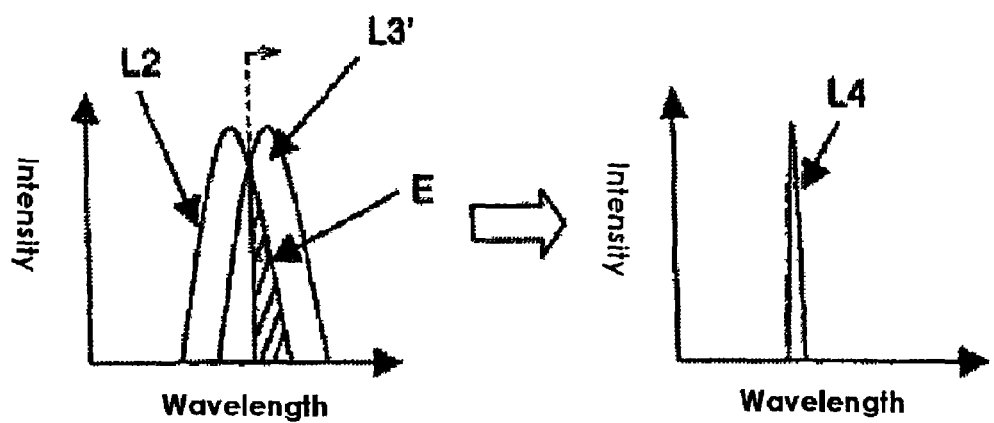
FIG. 20A
FIG. 20B
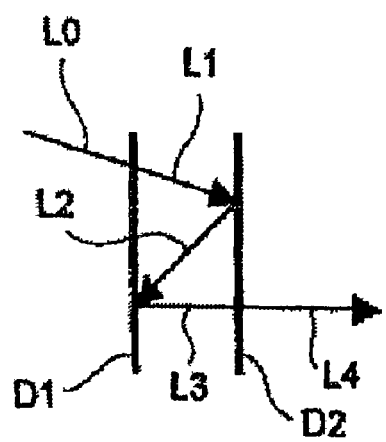
FIG. 21

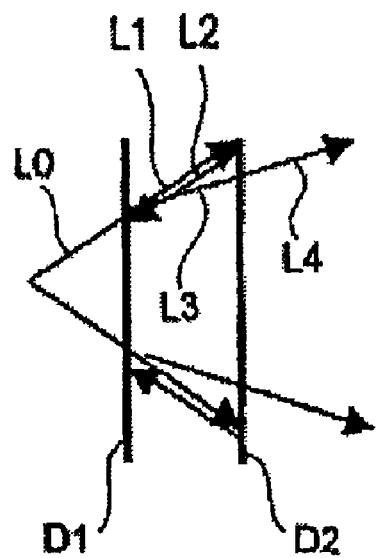
FIG. 34
FIG. 35A
FIG. 35B
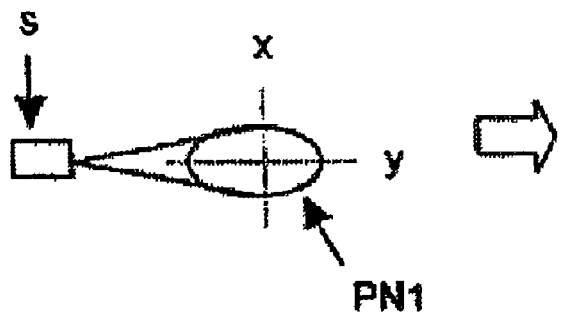
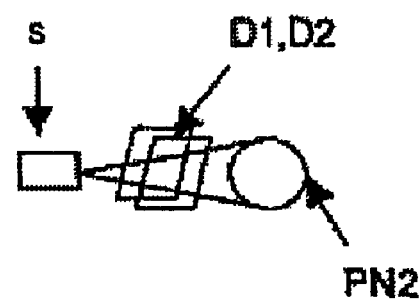

BAND-PASS FILTER AND IMAGE DISPLAY APPARATUS

RELATED APPLICATION

This application is based on application No. 2001-359069 filed in Japan, the content of which is hereby incorporated by reference.

FIELD OF THE INVENTION

The present invention relates to a band-pass filter and an image display apparatus, and more specifically, to an image display apparatus such as a head mounted display (HMD) projecting two-dimensional images on a display device such as a liquid crystal display (LCD) onto the viewer's eye through an eyepiece optical system, and a band-pass filter and an illuminating optical system used for the image display apparatus.

DESCRIPTION OF THE PRIOR ART

Light of a wavelength distribution necessary for the image display apparatus is obtained by using a band-pass filter. However, it is difficult to achieve size and weight reduction of the band-pass filter while securing a sharp wavelength distribution. Optical structures using the angle selectivity of a holographic optical element (HOE) to achieve optical element size reduction are proposed in U.S. Pat. Nos. 3,940,203, 4,830,464 and 4,874,214 and European Patent Application No. EP 943,934. The optical structures proposed by these documents adopt a so-called "pancake" system in which transmission and reflection are repeated between two opposed optical elements.

In these conventional examples, the diffraction action of the HOE is used for the power of the eyepiece optical system while the optical element thickness is reduced by bending the optical path. For this reason, the wavelength distribution of light is never changed when the light is reflected and transmitted, so that no band-pass filter effect is obtained although size reduction is achieved. In addition, the conventional examples cannot be used for illumination and beam shaping necessary for the image display apparatus.

SUMMARY OF THE INVENTION

An object of the present invention is to provide an improved band-pass filter and an image display apparatus using the band-pass filter.

Another object of the present invention is to provide a compact and lightweight band-pass filter with which a sharp wavelength distribution is obtained, and an image display apparatus capable of displaying high-quality images by using the band-pass filter.

Still another object of the present invention is to provide a compact illuminating optical system and a compact beam shaping optical system.

BRIEF DESCRIPTION OF THE DRAWINGS

This and other objects and features of this invention will become clear from the following description, taken in conjunction with the preferred embodiments with reference to the accompanied drawings in which:

FIG. 1 is an optical structure view showing the schematic structure of a first embodiment;

FIGS. 2(A) and 2(B) are graphs showing the wavelength distributions of light beams before and after wavelength limitation in the first embodiment;

FIG. 3 is an optical structure view showing the schematic structure of a second embodiment;

FIGS. 16(A) and 16(B) are graphs showing the wavelength distributions of light beams before and after wavelength limitation in the twelfth embodiment;

FIG. 17 is an optical structure view showing the schematic structure of a thirteenth embodiment;

FIG. 18 is an optical structure view showing the schematic structure of a fourteenth embodiment;

FIG. 19 is an optical structure view showing the schematic structure of a fifteenth embodiment;

FIGS. 20(A) and 20(B) are graphs showing the wavelength distributions of light beams before and after wavelength limitation in the fifteenth embodiment;

FIG. 21 is an optical structure view showing the schematic structure of a sixteenth embodiment;

FIG. 34 is an optical structure view showing the schematic cross-sectional structure, in a y direction, of the twenty-fifth embodiment;

FIGS. 35(A) and 35(B) are schematic views of assistance in explaining beam shapes before and after shaping in the twenty-fifth embodiment;

DESCRIPTION OF THE PREFERRED EMBODIMENT

Figure 4:
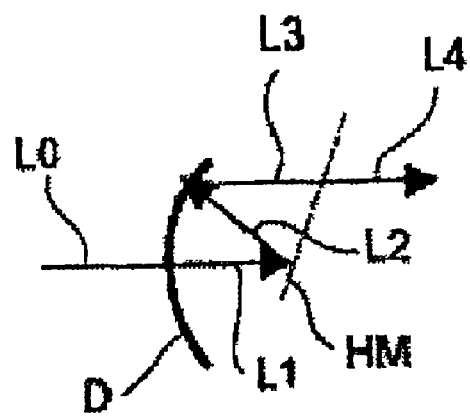
FIG. 4 is an optical structure view showing the schematic structure of a third embodiment.

Hereinafter, a band-pass filter, an image display apparatus and the like embodying the present invention will be described with reference to the drawings. The same and corresponding parts of the embodiments are designated by the same reference numbers and overlapping descriptions are omitted as appropriate.

<<Embodiments of the Band-Pass Filter (FIGS. 1 to 7); the Number of Reflecting Optical Elements is One, and Wavelength Limitation is Performed at the Time of Transmission or Reflection>>

FIG. 1 shows the optical structure and the optical path of a first embodiment. The first embodiment is a band-pass filter having a flat-shaped reflecting optical element (D) and a mirror (M) substantially parallelly opposed to the reflecting optical element (D). The reflecting optical element (D) has a fixed reflection angle selection region for wavelengths of a given region, and is capable of reflecting and transmitting light in accordance with the incident angle of the light by its angle selectivity.

As the reflecting optical element (D), a volume-phase and reflecting holographic optical element (HOE) is used. As the material therefor, although it is desirable to use photopolymer capable of being formed by a dry process, a silver salt material, gelatin dichromate or the like may be used as well. The reflecting optical element (D) is not limited to the HOE and other diffraction optical elements. It may be, for example, a multilayer film or a multilayer filter (see U.S. Pat. No. 6,157,490). The mirror (M) is a normal mirror that reflects light without affecting the wavelength distribution of the light. While the reflecting optical element (D) and the mirror (M) are opposed to each other with a predetermined distance in between, they may be bonded together as long as the incidence of a light beam (L0) on the reflecting optical element (D) is not hindered. By bonding the reflecting optical element (D) and the mirror (M) together, the band-pass filter can be further reduced in thickness.

In the band-pass filter shown in FIG. 1, the optical path is set so that the incident light beam (L0) from a light source such as a light emitting diode (LED) is obliquely incident on the reflecting optical element (D) and substantially vertically reflected because of the diffraction action there, the reflected light beam (L1) is reflected by the mirror (M), and the reflected light beam (L2) is substantially vertically transmitted by the reflecting optical element (D) and exits as a transmitted light beam (L3). At the reflecting optical element (D), reflection and transmission are each performed once, and at that time, the incident light beam (L0) and the reflected light beam (L2) are incident on the reflecting optical element (D) at different angles. Since the reflecting optical element (D) has a fixed reflection angle selection region for wavelengths of a given region, a wavelength region on the longer wavelength side or the shorter wavelength side of the wavelength distribution of the reflected light beams (L1, L2) obtained by the reflection at the reflecting optical element (D) can be cut away by the transmission at the reflecting optical element (D). An example thereof is shown in FIGS. 2(A) and 2(B).

The graphs in FIGS. 2(A) and 2(B) show the wavelength distributions of the light beams before and after the wavelength limitation on the longer wavelength side (the horizontal axis represents the wavelength, and the vertical axis represents the light intensity). As shown in FIG. 2(A), first, the wavelength distribution of the incident light beam (L0) becomes one with a narrow wavelength width (L1, L2) because of the reflection at the reflecting optical element (D). Then, a wavelength region (E, the hatched part on the right side of the broken line) on the longer wavelength side of the wavelength distribution of the reflected light beam (L2) is cut away by the transmission at the reflecting optical element (D), so that the wavelength width is narrower. Consequently, as shown in FIG. 2(B), a sharp wavelength distribution (L3) with a narrow wavelength width is obtained.

By performing reflection at least once and transmission at least once at different incident angles at the reflecting optical element (D) having angle selectivity for given wavelengths as described above, the band-pass filter can be reduced in thickness and wavelength limitation to arbitrarily change the wavelength distribution of the incident light beam (L0) can be performed. In that case, by performing at least once the transmission or the reflection to cut away a wavelength region on the longer wavelength side or the shorter wavelength side of the wavelength distribution obtained by performing reflection or transmission at least once, the wavelength distribution of the incident light beam (L0) can be changed to one with a narrow width (L3). Consequently, by appropriately controlling the angle of incidence on the reflecting optical element (D), the band-pass filter can be reduced in size and weight, and further, a sharp wavelength distribution can be easily obtained. From this point of view, the order in which the actions are performed on the light at the reflecting optical element (D) is not limited to reflection first and transmission second, but may be transmission first and reflection second. A second to a fifth embodiment thus structured will be described below.

Figure 5:
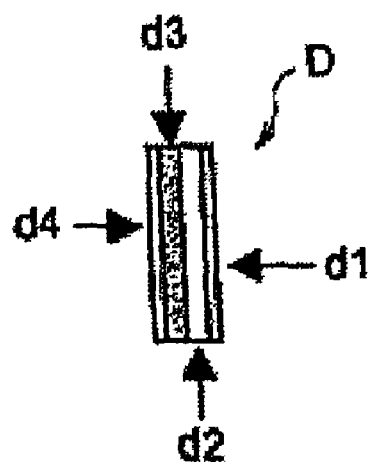
FIG. 5 is a cross-sectional view showing an example of a reflecting optical element used in the first to the third embodiments.

FIGS. 3 and 4 show the optical structures and the optical paths of the second and the third embodiments. The second embodiment (FIG. 3) is a band-pass filter having a flat-shaped reflecting optical element (D) and a half mirror (HM) disposed obliquely to the reflecting optical element (D). The third embodiment (FIG. 4) is a band-pass filter having a spherical reflecting optical element (D) and a half mirror (HM) disposed obliquely to the reflecting optical element (D). The optical surface constituting the reflecting optical element (D) may be a plane surface like those of the first and the second embodiment or may be a curved surface like that of the third embodiment. By using a curved surface for the reflecting optical element (D), an optical power can be easily provided. However, when the reflecting optical element (D) comprises an HOE, an optical power can be provided even when its optical surface is a plane surface. The cross-sectional view of FIG. 5 shows an example of the reflecting optical element (D) comprising an HOE used for the first to the third embodiments. In FIG. 5, d1 represents an anti reflection (AR) coating, d2 represents a glass substrate, d3 represents an HOE layer, and d4 represents a barrier layer.

In the band-pass filters shown in FIGS. 3 and 4, the optical path is set so that the incident light beam (L0) is transmitted by the reflecting optical element (D), the transmitted light beam (L1) is reflected by the half mirror (HM), the reflected light beam (L2) is reflected because of the diffraction action at the reflecting optical element (D), and the reflected light beam (L3) is transmitted by the half mirror (HM) and exits as a transmitted light beam (L4). Like in the first embodiment, reflection and transmission are each performed once at the reflecting optical element (D), and at that time, the incident light beam (L0) and the reflected light beam (L2) are incident on the reflecting optical element (D) at different angles. Since the reflecting optical element (D) has a fixed reflection angle selection region for wavelengths of a given region, a wavelength region on the longer wavelength side or the shorter wavelength side of the wavelength distribution of the light beams (L1, L2) obtained by the transmission at the reflecting optical element (D) can be cut away by the reflection at the reflecting optical element (D).

When the order in which the actions are performed on the light at the reflecting optical element (D) is transmission first and reflection second, it is easy to use a selectively reflecting mirror such as the half mirror (HM) having light quantity selectivity in combination with the reflecting optical element (D). Examples of the selectively reflecting mirror include, in addition to the half mirror (HM), a polarizing beam splitter (PBS), a sheet-shaped beam splitter (for example, the product name, DBEF, manufactured by Sumitomo 3M Ltd.), a wire grid and cholesteric liquid crystal. The optical structures and the optical paths of the fourth and the fifth embodiments having a selectively reflecting mirror other than the half mirror (HM) are shown in FIGS. 6 and 7.

The fourth embodiment (FIG. 6) is a band-pass filter having a flat-shaped reflecting optical element (D), and a structure comprising a quarter-wave plate (W) and a sheet-shaped beam splitter (P1) bonded together which structure is substantially parallelly opposed to the reflecting optical element (D). The fifth embodiment (FIG. 7) is a band-pass filter having a flat-shaped reflecting optical element (D), and a structure comprising a quarter-wave plate (W) and cholesteric liquid crystal (P2) bonded together which structure is substantially parallelly opposed to the reflecting optical element (D). Polarizing optical elements such as the sheet-shaped beam splitter (P1) and the cholesteric liquid crystal (P2) are reflecting members having polarization selectivity (that is, a property of reflecting only a specific linearly polarized light beam and transmitting the other kinds of light beams). The PBS and the wire grid are also reflecting members having this property.

Figure 6:
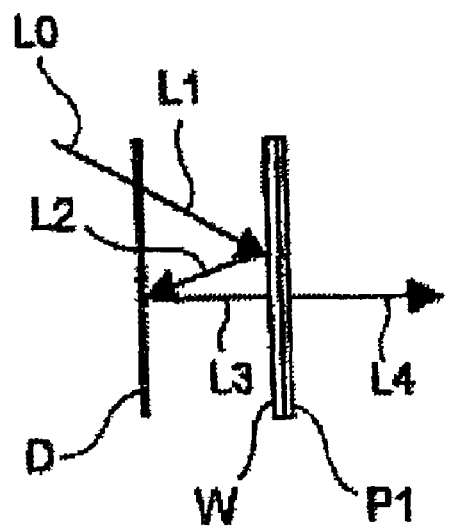
FIG. 6 is an optical structure view showing the schematic structure of a fourth embodiment.
Figure 7:
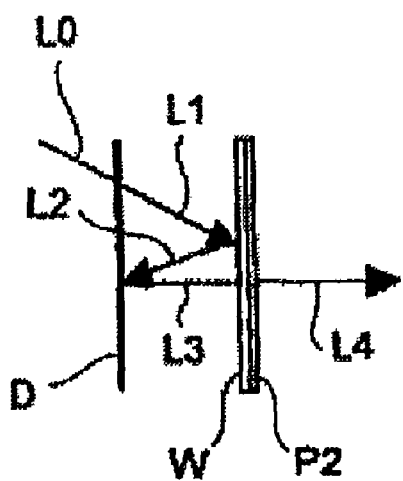
FIG. 7 is an optical structure view showing the schematic structure of a fifth embodiment.

In the band-pass filters shown in FIGS. 6 and 7, a circularly polarized light beam from a display device such as an LCD is transmitted by the reflecting optical element (D) as an incident light beam (L0), and the transmitted light beam (L1) becomes a linearly polarized light beam (for example, an s-polarized light beam) by being transmitted by the quarter-wave plate (W), is reflected by the polarizing optical elements (P1, P2) and then, becomes a circularly polarized reflected light beam (L2) by being again transmitted by the quarter-wave plate (W). The reflected light beam (L2) is reflected because of the diffraction action at the reflecting optical element (D), and the reflected light beam (L3) becomes a linearly polarized light beam (for example, a p-polarized light beam) by being transmitted by the quarter-wave plate (W). Then, the linearly polarized light beam is transmitted by the polarizing optical elements (P1, P2) and exits as a transmitted light beam (L4). By structuring the band-pass filter so that polarized light is made incident on the reflecting optical element (D) by using the polarizing optical elements (P1, P2) as described above, unnecessary light such as ghost can be cut.

<<Embodiments of the Band-Pass Filter (FIGS. 8 to 14); the Number of Reflecting Optical Elements is Two or Three, and Wavelength Limitation is Performed at the Time of Transmission>>

Figure 8:
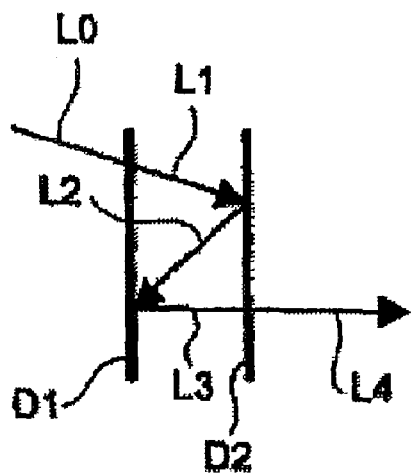
FIG. 8 is an optical structure view showing the schematic structure of a sixth embodiment.

FIG. 8 shows the optical structure and the optical path of a sixth embodiment. The sixth embodiment is a band-pass filter where two flat-shaped first and second reflecting optical elements (D1, D2) are substantially parallelly opposed. The first and the second reflecting optical elements (D1, D2) each have a fixed reflection angle selection region for wavelengths of a given region like the reflecting optical element (D), and are capable of reflecting and transmitting light in accordance with the incident angle of the light by their angle selectivities for the given wavelengths (HOEs, multilayer films, multilayer filters or the like). However, the reflection angle selection regions of the first and the second reflecting optical elements (D1, D2) are different from each other. The difference in angle selectivity enables the first and the second reflecting optical elements (D1, D2) to be substantially parallelly opposed, and this enables a further thickness reduction of the band-pass filter. Changing the optical path enables the use of a first and a second reflecting optical element (D1, D2) having the same reflection angle selection region.

Figure 9A:
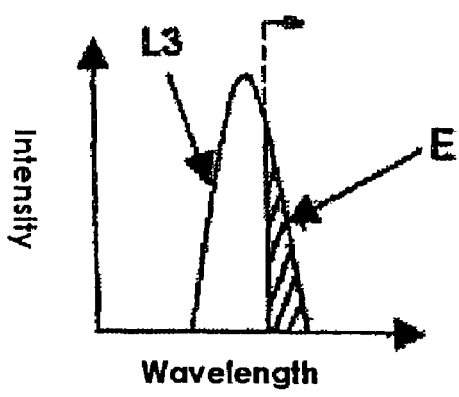
FIGS. 9(A) and 9(B) are graphs showing the wavelength distributions of light beams before and after wavelength limitation in the sixth embodiment.
Figure 9B:
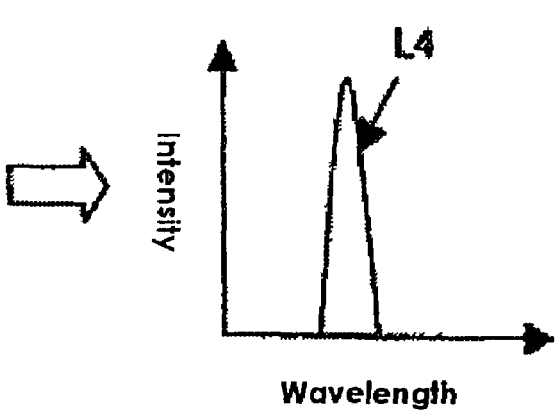
Figure 10:
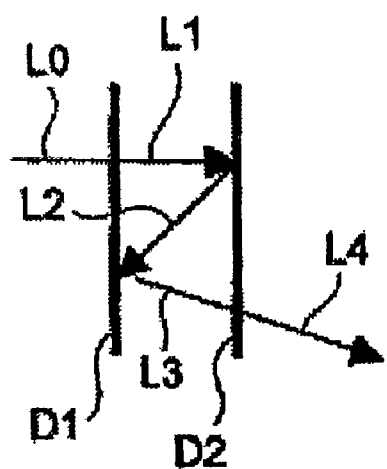
FIG. 10 is an optical structure view showing the schematic structure of a seventh embodiment.

In the band-pass filter shown in FIG. 8, the optical path is set so that the incident light beam (L0) from a light source such as an LED is obliquely transmitted by the first reflecting optical element (D1), the transmitted light beam (L1) is obliquely reflected by the second reflecting optical element (D2), the reflected light beam (L2) is reflected by the first reflecting optical element (D1), and the reflected light beam (L3) is substantially vertically transmitted by the second reflecting optical element (D2) and exits as a transmitted light beam (L4). At the first and the second reflecting optical elements (D1, D2), reflection and transmission are each performed once. At that time, the incident light beam (L0) and the reflected light beam (L2) are incident on the first reflecting optical element (D1) at different angles, and the transmitted light beam (L1) and the reflected light beam (L3) are incident on the second reflecting optical element (D2) at different angles. Since the second reflecting optical element (D2) has a fixed reflection angle selection region for wavelengths of a given region, a wavelength region on the longer wavelength side or the shorter wavelength side of the wavelength distribution of the reflected light beam (L3) obtained by the transmission at the first reflecting optical element (D1) and the reflection at the first and the second reflecting optical elements (D1, D2) can be cut away by the transmission at the second reflecting optical element (D2). An example thereof is shown in FIGS. 9(A) and 9(B). The graphs in FIGS. 9(A) and 9(B) show the wavelength distributions of the light beams before and after the wavelength limitation on the longer wavelength side (the horizontal axis represents the wavelength, and the vertical axis represents the light intensity). As shown in FIG. 9(A), a wavelength region (E, the hatched part on the right side of the broken line) on the longer wavelength side of the wavelength distribution of the reflected light beam (L3) is cut away by the transmission at the second reflecting optical element (D2), so that the wavelength width is narrower. Consequently, as shown in FIG. 9(B), a sharp wavelength distribution (L4) with a narrow wavelength width is obtained. Since two reflecting optical elements (D1, D2) are used, a band-pass effect with a narrower wavelength width can be obtained.

By performing transmission and reflection at the first reflecting optical element (D1) and reflection at the second reflecting optical element (D2) as described above, the wavelength width of the wavelength distribution of the incident light beam (L0) can be made narrow (L3), and further, by performing transmission to limit the wavelength of the reflected light beam (L3) at the second reflecting optical element (D2), the wavelength distribution of the incident light beam (L0) can be arbitrarily changed. That is, in the sixth embodiment, the degree of freedom of the wavelength limitation is increased by using the first reflecting optical element (D1) instead of the mirror (M) used in the first embodiment (FIG. 1). Therefore, by performing transmission at least once and reflection at least once at the first and the second reflecting optical elements (D1, D2) to reduce the thickness of the band-pass filter, the wavelength distribution of the incident light beam (L0) can be arbitrarily changed by performing another transmission to limit the wavelength of the light beam before and after the transmission and the reflection.

In that case, by performing at least once the transmission to cut away a wavelength region on the longer wavelength side or the shorter wavelength side of the wavelength distribution obtained by performing reflection or transmission at least once, the wavelength distribution of the incident light beam (L0) can be changed to one with a narrow width (L4). Consequently, by appropriately controlling the angles of incidence on the first and the second reflecting optical elements (D1, D2), the band-pass filter can be reduced in size and weight, and further, a sharp wavelength distribution can be easily obtained. From this point of view, the disposition, the optical path, the number and the like of the reflective optical elements (D1, D2) are not limited to the ones of the sixth embodiment (FIG. 8). A seventh to an eleventh embodiment having such a structure will be described below.

FIGS. 10 to 14 show the optical structures and the optical paths of the seventh to the eleventh embodiments. In the seventh embodiment (FIG. 10), the actions on light and the optical paths of the first and the second reflecting optical elements (D1, D2) in the sixth embodiment (FIG. 8) are interchanged. Therefore, the incident light beam (L0) is substantially vertically incident on the first reflecting optical element (D1), and the transmitted light beam (L4) exits obliquely to the second reflecting optical element (D2). In the eighth and the ninth embodiments (FIGS. 11 and 12), the first and the second reflecting optical elements (D1, D2) are non-parallelly opposed. By thus disposing the reflecting optical elements (D1, D2) so as to be inclined with respect to each other, the reflecting optical elements (D1, D2) can reflect or transmit a light beam of a different wavelength region even when their angle selectivities are the same. Consequently, band-pass filters reflecting or transmitting light beams of different wavelength regions can be easily formed. Moreover, by disposing the reflecting optical elements (D1, D2) so as to be inclined with respect to each other, an advantage is obtained that the diffraction efficiencies of the HOEs constituting the reflecting optical elements (D1, D2) can be improved. However, when the first and the second reflecting optical elements (D1, D2) comprise HOEs, an effect produced by disposing the reflecting optical elements so as to be inclined with respect to each other can be easily provided also when the reflecting optical elements are parallelly opposed.

The tenth embodiment (FIG. 13) is a band-pass filter comprising three first to third reflecting optical elements (D1, D2, D3). By thus combining at least three reflecting optical elements (D1, . . . ), a larger band-pass effect can be obtained. Moreover, addition of a plurality of functions such as provision of an optical power is possible. In the ninth and the tenth embodiments (FIGS. 12 and 13), reflection at the first and the second reflecting optical elements (D1, D2) and at the third reflecting optical element (D3) is performed a total of four times. Further, in the tenth embodiment (FIG. 13), transmission at the first to the third reflecting optical elements (D1 to D3) is performed a total of five times. By thus performing reflection and transmission at the reflecting optical elements (D1, . . . ) at least three times, wavelength cutting can be stepwisely performed by gradually changing the angles of incidence on the reflecting optical elements (D1, . . . ). Consequently, a sharper wavelength distribution can be obtained.

Figure 11:
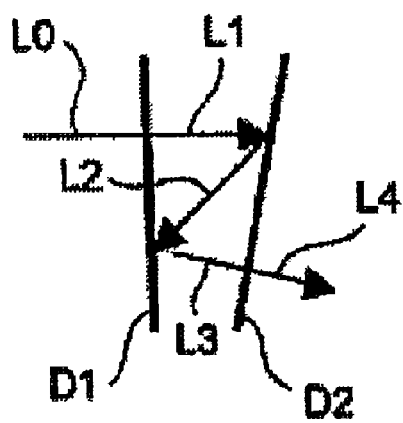
FIG. 11 is an optical structure view showing the schematic structure of an eighth embodiment.
Figure 12:
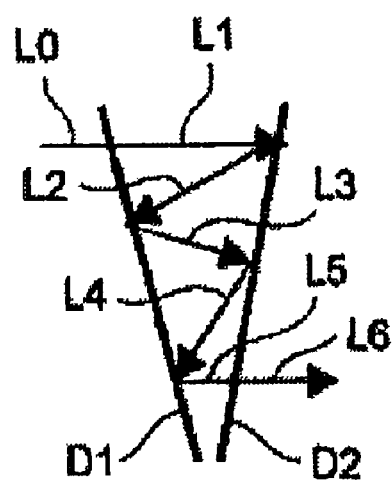
FIG. 12 is an optical structure view showing the schematic structure of a ninth embodiment.
Figure 13:
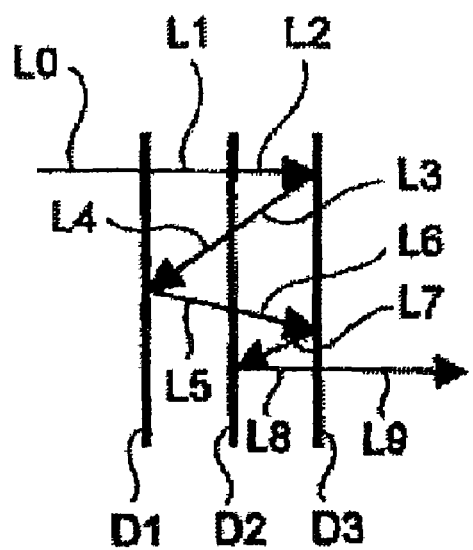
FIG. 13 is an optical structure view showing the schematic structure of a tenth embodiment.
Figure 14:
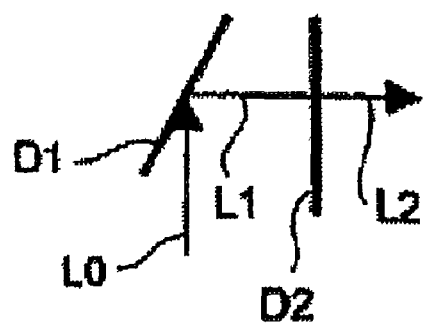
FIG. 14 is an optical structure view showing the schematic structure of an eleventh embodiment.

In the eleventh embodiment (FIG. 14), the first and the second reflecting optical elements (D1, D2) are non-parallelly opposed like in the eighth and the ninth embodiments (FIGS. 11 and 12). At the first reflecting optical element (D1), only one reflection is performed, and at the second reflecting optical element (D2), only one transmission is performed. The incident light beam (L0) is reflected by the first reflecting optical element (D1), and wavelength limitation is performed by the reflected light beam (L1) being transmitted by the second reflecting optical element (D2). Consequently, the wavelength distribution of the incident light beam (L0) is changed to one with a narrow wavelength width (L2), so that a sharp wavelength distribution is obtained.

<<Embodiments of the Band-Pass Filter (FIGS. 15 to 18); the Number of Reflecting Optical Elements is Two, and Wavelength Limitation is Performed at the Time of Reflection>>

Figure 15:
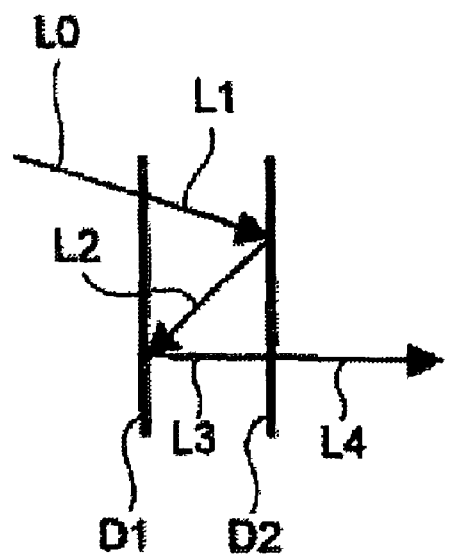
FIG. 15 is an optical structure view showing the schematic structure of a twelfth embodiment.

FIG. 15 shows the optical structure and the optical path of a twelfth embodiment. The twelfth embodiment is characterized in that the wavelength limitation is performed when light is reflected by the first reflecting optical element (D1). Except this, the structure is similar to that of the sixth embodiment (FIG. 8). Since the first reflecting optical element (D1) has a fixed reflection angle selection region for wavelengths of a given region, a wavelength region on the longer wavelength side or the shorter wavelength side of the wavelength distribution of the reflected light beam (L2) obtained by the transmission at the first reflecting optical element (D1) and the reflection at the second reflecting optical element (D2) can be cut away by the reflection at the first reflecting optical element (D1). An example thereof is shown in FIGS. 16(A) and 16(B).

The graphs in FIGS. 16(A) and 16(B) show the wavelength distributions of the light beams before and after the wavelength limitation on the shorter wavelength side (the horizontal axis represents the wavelength, and the vertical axis represents the light intensity). As shown in FIG. 16(A), since the wavelength distribution (L3') of the light beam reflected by the first reflecting optical element (D1) is on the longer wavelength side of the wavelength distribution of the reflected light beam (L2), a wavelength region on the shorter wavelength side of the wavelength distribution of the reflected light beam (L2) is cut away by the reflection at the first reflecting optical element (D1), so that the wavelength width is narrower. Consequently, a sharp wavelength distribution (L3, L4) with a narrow wavelength width is obtained as shown in FIG. 16(B). Since the second reflecting optical element (D2) has angle selectivity to transmit all of the wavelength distribution of the vertically incident reflected light beam (L3), the wavelength distributions of the reflected light beam (L3) and the transmitted light beam (L4) are the same.

By performing transmission at the first reflecting optical element (D1) and reflection at the second reflecting optical element (D2) as described above, the wavelength width of the wavelength distribution of the incident light beam (L0) can be made narrow (L2), and further, by performing reflection to limit the wavelength of the reflected light beam (L2) at the first reflecting optical element (D1), the wavelength distribution of the incident light beam (L0) can be arbitrarily changed. That is, in the twelfth embodiment, the degree of freedom of the wavelength limitation is increased by using the second reflecting optical element (D2) instead of the selectively reflecting mirror (for example, the half mirror (HM)) used in the second to the fifth embodiments (FIGS. 3, 4, 6 and 7). Therefore, by performing transmission at least once and reflection at least once at the first and the second reflecting optical elements (D1, D2) to reduce the thickness of the band-pass filter, the wavelength distribution of the incident light beam (L0) can be arbitrarily changed by performing another reflection to limit the wavelength of the light beam before and after the transmission and the reflection.

In that case, by performing at least once the reflection to cut away a wavelength region on the longer wavelength side or the shorter wavelength side of the wavelength distribution obtained by performing reflection or transmission at least once, the wavelength distribution of the incident light beam (L0) can be changed to one with a narrow width (L3, L4). Consequently, by appropriately controlling the angles of incidence on the first and the second reflecting optical elements (D1, D2), the band-pass filter can be reduced in size and weight, and further, a sharp wavelength distribution can be easily obtained. From this point of view, the disposition and the like of the reflective optical elements (D1, D2) are not limited to the ones of the twelfth embodiment (FIG. 15). A thirteenth and a fourteenth embodiment having such a structure will be described below.

FIGS. 17 and 18 show the optical structures and the optical paths of the thirteenth and the fourteenth embodiments. In these embodiments, the first and the second reflecting optical elements (D1, D2) are non-parallelly opposed. In the thirteenth embodiment (FIG. 17), at the first reflecting optical element (D1), transmission and reflection are each performed once, and at the second reflecting optical element (D2), only one reflection is performed. The incident light beam (L0) is transmitted by the first reflecting optical element (D1), and the transmitted light beam (L1) is reflected by the second reflecting optical element (D2). Then, the reflected light beam (L2) incident at an angle different from the angle at which the incident light beam (L0) is transmitted by the first reflecting optical element (D1) is reflected by the first reflecting optical element (D1) to thereby perform wavelength limitation. Consequently, the wavelength distribution of the incident light beam (L0) is changed to one with a narrow wavelength width (L3), so that a sharp wavelength distribution is obtained. In the fourteenth embodiment (FIG. 18), only one reflection is performed at each of the first and the second reflecting optical elements (D1, D2). The incident light beam (L0) is reflected by the first reflecting optical element (D1), and the reflected light beam (L1) is reflected by the second reflecting optical element (D2) to thereby perform wavelength limitation. Consequently, the wavelength distribution of the incident light beam (L0) is changed to one with a narrow wavelength width (L3), so that a sharp wavelength distribution is obtained.

<<Embodiments of the Band-Pass Filter (FIGS. 19 to 22); the Number of Reflecting Optical Elements is Two, and Wavelength Limitation is Performed at the Time of Reflection and Transmission>>

FIG. 19 shows the optical structure and the optical path of a fifteenth embodiment. The fifteenth embodiment is characterized in that the wavelength limitation is performed when light is reflected by the first reflecting optical element (D1) and when light is transmitted by the second reflecting optical element (D2). Except this, the structure is similar to that of the sixth and the twelfth embodiments (FIGS. 8 and 15). Since the first and the second reflecting optical elements (D1, D2) each have angle selectivity for given wavelengths as mentioned above, a wavelength region on the longer wavelength side or the shorter wavelength side of the wavelength distribution of the reflected light beam (L2) can be cut away by the reflection at the first reflecting optical element (D1), and a wavelength region on the longer wavelength side or the shorter wavelength side of the wavelength distribution of the reflected light beam (L3) can be cut away by the transmission at the second reflecting optical element (D2). An example thereof is shown in FIGS. 20(A) and 20(B).

The graphs in FIGS. 20(A) and 20(B) show the wavelength distributions of the light beams before and after the wavelength limitation on both sides (the longer wavelength side and the shorter wavelength side) of the wavelength distribution (the horizontal axis represents the wavelength, and the vertical axis represents the light intensity). As shown in FIG. 20(A), since the wavelength distribution (L3') of the light beam reflected by the first reflecting optical element (D1) is on the longer wavelength side of the wavelength distribution of the reflected light beam (L2), a wavelength region on the shorter wavelength side of the wavelength distribution of the reflected light beam (L2) is cut away by the reflection at the first reflecting optical element (D1), so that the wavelength width is narrower. Then, a wavelength region (E, the hatched part on the right side of the broken line) on the longer wavelength side of the wavelength distribution of the reflected light beam (L3) is cut away by the transmission at the second reflecting optical element (D2), so that the wavelength width is narrower. Consequently, as shown in FIG. 20(B), a sharp wavelength distribution (L4) with a narrow wavelength width where both sides of the wavelength distribution are cut away is obtained.

By performing transmission at the first reflecting optical element (D1) and reflection at the second reflecting optical element (D2) as described above, the wavelength width of the wavelength distribution of the incident light beam (L0) can be made narrow (L2), and further, by performing reflection and transmission to limit the wavelength of the reflected light beam (L2) at the first and the second reflecting optical elements (D1, D2), the wavelength distribution of the incident light beam (L0) can be arbitrarily changed. That is, in the fifteenth embodiment, the number of times of the wavelength limitation is increased by providing the characteristics of both of the sixth and the twelfth embodiments (FIGS. 8 and 15). Therefore, by performing transmission at least once and reflection at least once at the first and the second reflecting optical elements (D1, D2) to reduce the thickness of the band-pass filter, the wavelength distribution of the incident light beam (L0) can be arbitrarily changed by performing another reflection and transmission to limit the wavelength of the light beam before and after the transmission and the reflection.

In that case, by performing at least once the reflection to cut away a wavelength region on the longer wavelength side and the shorter wavelength side of the wavelength distribution obtained by performing reflection or transmission at least once, the wavelength distribution of the incident light beam (L0) can be changed to one with a narrow width (L4). Consequently, by appropriately controlling the angles of incidence on the first and the second reflecting optical elements (D1, D2), the band-pass filter can be reduced in size and weight, and further, a sharp wavelength distribution can be easily obtained. From this point of view, a wavelength limitation function can be further added to the fifteenth embodiment (FIG. 19). A sixteenth embodiment having such a structure will be described below.

FIG. 21 shows the optical structure and the optical path of the sixteenth embodiment. The sixteenth embodiment is characterized in that the wavelength limitation is performed when light is transmitted by the first reflecting optical element (D1) as well as when light is reflected by the first reflecting optical element (D1) and when light is transmitted by the second reflecting optical element (D2). Except this, the structure is similar to that of the fifteenth embodiment (FIG. 19). Since the first reflecting optical element (D1) has a fixed reflection angle selection region for wavelengths of a given region, a wavelength region on the longer wavelength side or the shorter wavelength side of the wavelength distribution of the incident light beam (L0) can be cut away by the transmission at the first reflecting optical element (D1). An example thereof is shown in FIGS. 22(A) and 22(B).

Figure 22A:
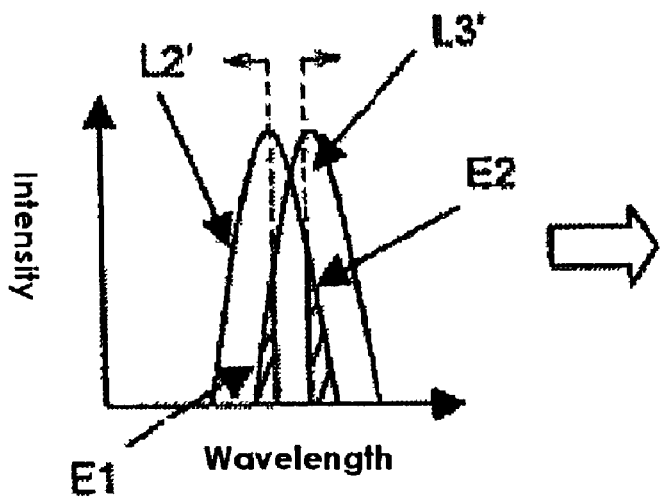
FIGS. 22(A) and 22(B) are graphs showing the wavelength distributions of light beams before and after wavelength limitation in the sixteenth embodiment.
Figure 22B:
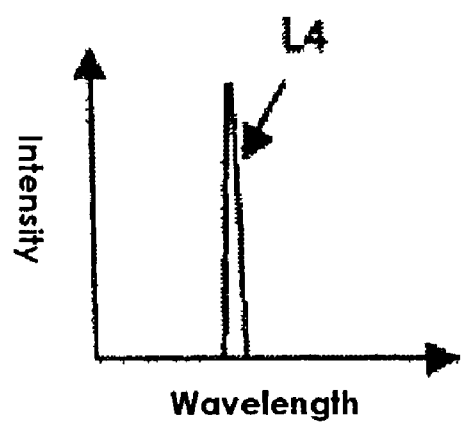

The graphs in FIGS. 22(A) and 22(B) show the wavelength distributions of the light beams before and after the wavelength limitation on both sides (the longer wavelength side and the shorter wavelength side) of the wavelength distribution (the horizontal axis represents the wavelength, and the vertical axis represents the light intensity). As shown in FIG. 22(A), a wavelength region (E1, the hatched part on the left side of the broken line) on the shorter wavelength side of the wavelength distribution of the incident light beam (L0) is cut away by the transmission at the first reflecting optical element (D1), so that the wavelength width is narrower. Since the wavelength distribution (L3') of the light beam reflected by the first reflecting optical element (D1) is on the longer wavelength side of the wavelength distribution of the light beam (L2') reflected by the second reflecting optical element (D2), a wavelength region on the shorter wavelength side of the wavelength distribution of the reflected light beam (L2) is cut away by the reflection at the first reflecting optical element (D1), so that the wavelength width is narrower. Then, a wavelength region (E2, the hatched part on the right side of the broken line) on the longer wavelength side of the wavelength distribution of the reflected light beam (L3) is cut away by the transmission at the second reflecting optical element (D2), so that the wavelength width is narrower. Consequently, a sharp wavelength distribution (L4) with a narrower wavelength width where both sides of the wavelength distribution are cut away is obtained as shown in FIG. 22(B).

By increasing the number of times of the wavelength limitation by repeating reflection and transmission a plurality of times like in the sixteenth embodiment, a light beam with a wavelength distribution having a narrow half width is obtained. The wavelengths cut away by the reflection at the first reflecting optical element (D1) and the wavelengths cut away by the reflection at the second reflecting optical element (D2) may be the same. That is, the wavelength widths of the wavelength distributions of the reflected light beam (L2) and the reflected light beam (L3) may be the same. Therefore, wavelength limitation may be performed at the time of the reflection at the second reflecting optical element (D2) instead of at the time of the reflection at the first reflecting optical element (D1).

<<Embodiment of the Band-Pass Filter (FIGS. 23 and 24); the Number of Reflecting Optical Elements is Two, and Wavelength Limitation is Performed at the Time of Multi-Wavelength Transmission>>

Figure 23:
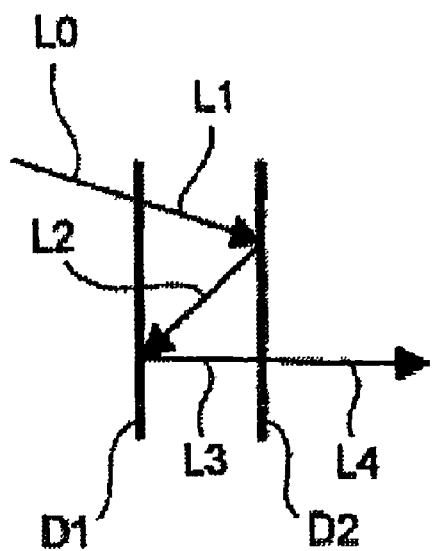
FIG. 23 is an optical structure view showing the schematic structure of a seventeenth embodiment.
Figure 24A:
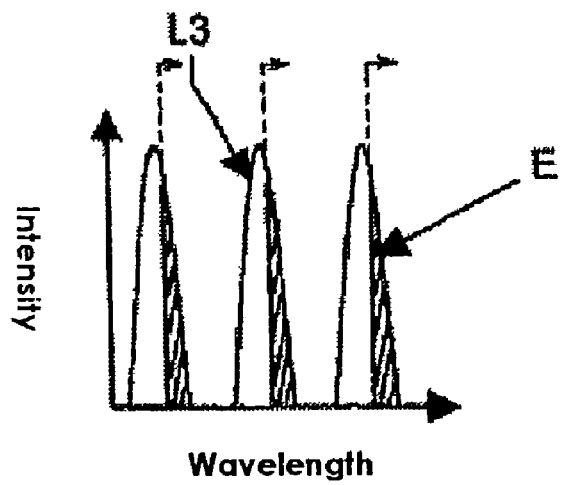
FIGS. 24(A) and 24(B) are graphs showing the wavelength distributions of light beams before and after wavelength limitation in the seventeenth embodiment.
Figure 24B:
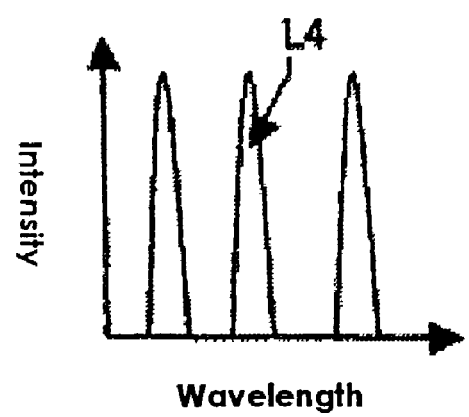

FIG. 23 shows the optical structure and the optical path of a seventeenth embodiment. The seventeenth embodiment is characterized in that three wavelengths are limited when light is transmitted by the second reflecting optical element (D2). Except this, the structure is similar to that of the sixth embodiment (FIG. 8). That is, the first and the second reflecting optical elements (D1, D2) are each a diffraction optical element (HOE) having three different diffraction center wavelengths (for example, red (R), green (G) and blue (B) corresponding to the three primary colors), and transmission to cut away a wavelength region on the longer wavelength side of each of the wavelength distributions of the reflected light beam (L3) corresponding to the diffraction center wavelengths is performed at the second reflecting optical element (D2). FIGS. 24(A) and 24(B) show the change of the wavelength distribution.

The graphs in FIGS. 24(A) and 24(B) show the wavelength distributions of the light beams before and after the wavelength limitation on the longer wavelength side of each of the three wavelengths (the horizontal axis represents the wavelength, and the vertical axis represents the light intensity). As shown in FIG. 24(A), a wavelength region (E, the hatched part on the right side of the broken line) on the longer wavelength side of the wavelength distribution of the reflected light beam (L3) is cut away by the transmission at the second reflecting optical element (D2), so that the wavelength width is narrower. Consequently, as shown in FIG. 24(B), a sharp wavelength distribution (L4) with a narrower wavelength width is obtained for the wavelength regions corresponding to the diffraction center wavelengths.

The first and the second reflecting optical elements (D1, D2) may each be one comprising one element (for example, an HOE formed by multiple exposure) or may each be one comprising at least two elements limiting the wavelengths which elements are superposed one on another or bonded together. In the structure designed for a multiplicity of wavelengths like the present embodiment, a diffraction effect of high efficiency can be obtained when the one comprising a plurality of elements superposed one on another or bonded together is used, although the one formed by multiple exposure is easier to form. Moreover, the wavelength limitation may be performed at the time of reflection or at the time of reflection and transmission like in the twelfth, the fifteenth and the sixteenth embodiments (FIGS. 15, 19 and 21).

By the first and the second reflecting optical elements (D1, D2) being diffraction optical elements (HOEs or the like) having at least two diffraction center wavelengths and by performing at least once the transmission or the reflection to cut away a wavelength region on the longer wavelength side or the shorter wavelength side of each of the wavelength distributions, corresponding to the diffraction center wavelengths, obtained by performing reflection or transmission at least once as described above, the wavelength distribution of the incident light beam (L0) can be changed to one with a narrow width (L4) for the wavelength regions corresponding the diffraction center wavelengths. For example, the light beams of the wavelengths corresponding to R, G and B of an LED light source can be narrowed in wavelength, so that an inexpensive and thin color (RGB) band-pass filter can be obtained. When the first and the second reflecting optical elements (D1, D2) comprise HOEs which are easy to form, the limitation of the wavelengths can be efficiently performed.

<<Embodiment of the Band-Pass Filter (FIGS. 25 and 26); the Number of Reflecting Optical Elements is Two (with an Optical Power), and Wavelength Limitation is Performed at the Time of Transmission>>

Figure 25:
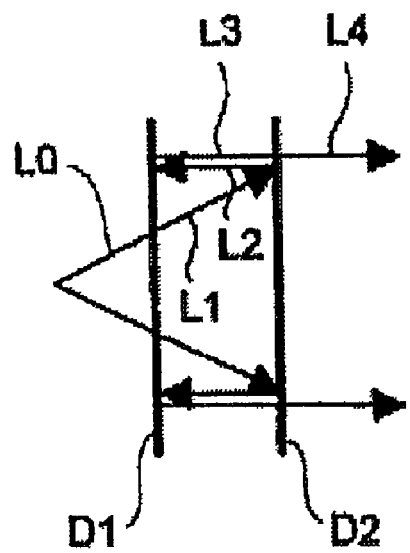
FIG. 25 is an optical structure view showing the schematic structure of an eighteenth embodiment.
Figure 26A:
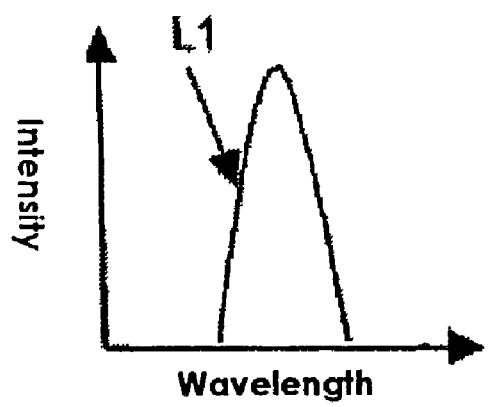
FIGS. 26(A) and 26(B) are graphs showing the wavelength distributions of light beams before and after wavelength limitation in the eighteenth embodiment.
Figure 26B:
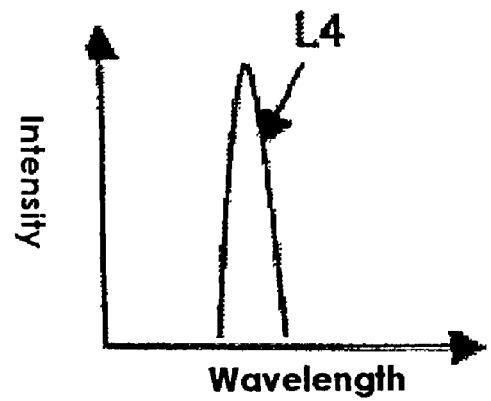

FIG. 25 shows the optical structure and the optical path of an eighteenth embodiment. The eighteenth embodiment is characterized in that the second reflecting optical element (D2) has a positive optical power. Except this, the structure is similar to that of the sixth embodiment (FIG. 6). In this band-pass filter, the incident light beam (L0) diverging from a light source such as an LED is transmitted by the first reflecting optical element (D1), the transmitted light beam (L1) is substantially vertically reflected by the positive optical power of the second reflecting optical element (D2), and the reflected light beam (L2) is substantially vertically reflected by the first reflecting optical element (D1). The reflected light beam (L3) is wavelength-limited when substantially vertically transmitted by the second reflecting optical element (D2) and exits as a parallel transmitted light beam (L4). FIGS. 26(A) and 26(B) show the change of the wavelength distribution.

The graphs in FIGS. 26(A) and 26(B) show the wavelength distribution of the light beam before and after the wavelength limitation (the horizontal axis represents the wavelength, and the vertical axis represents the light intensity). As shown in FIG. 26(A), a wavelength region of the wavelength distribution of the transmitted light beam (L1) is cut away by the transmission at the second reflecting optical element (D2), so that the wavelength width is narrower. Consequently, as shown in FIG. 26(B), a sharp wavelength distribution (L4) with a narrow wavelength width is obtained.

While a positive optical power is provided to the second reflecting optical element (D2), an optical power may be provided to the first reflecting optical element (D1). Moreover, either a positive or a negative optical power may be provided to both the first and the second reflecting optical elements (D1, D2). By providing either a positive or a negative optical power to at least one of the first and the second reflecting optical elements (D1, D2), a lens function (for example, a condenser lens function) can be added to the band-pass filter, so that a multifunction band-pass filter is obtained.

<<Embodiments of the Illuminating Optical System (FIGS. 27 and 28); the Number of Reflecting Optical Elements is Two (with a Lens Function)>>

Figure 27:
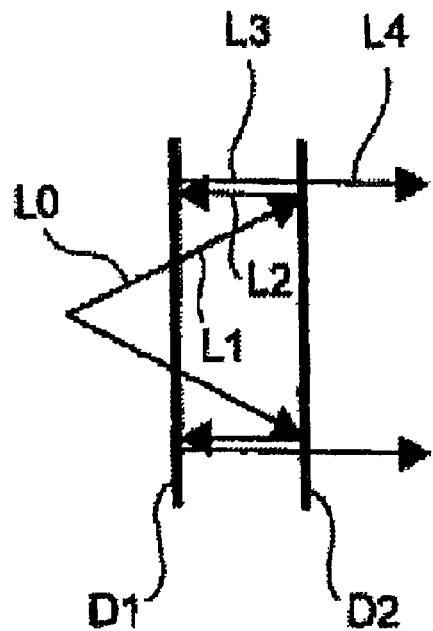
FIG. 27 is an optical structure view showing the schematic structure of a nineteenth embodiment.
Figure 28:
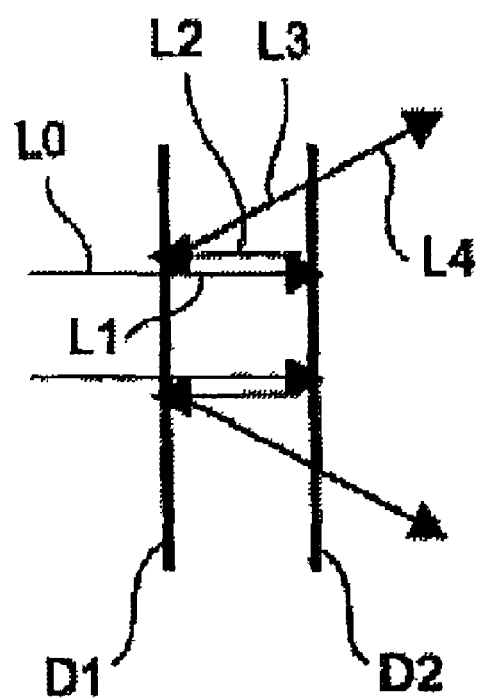
FIG. 28 is an optical structure view showing the schematic structure of a twentieth embodiment.

FIGS. 27 and 28 show the optical structures and the optical paths of a nineteenth and a twentieth embodiment. The nineteenth embodiment is characterized in that the second reflecting optical element (D2) has a positive optical power. The twentieth embodiment is characterized in that the first reflecting optical element (D1) has a negative optical power. In the illuminating optical systems of the nineteenth and the twentieth embodiments, the optical path is set so that the incident light beam (L0) is transmitted by the first reflecting optical element (D1), the transmitted light beam (L1) is reflected by the second reflecting optical element (D2), the reflected light beam (L2) is reflected by the first reflecting optical element (D1) and then, the reflected light beam (L3) is transmitted by the second reflecting optical element (D2) so that the transmitted light beam (L4) exits. Because of the optical powers of the first and the second reflecting optical elements (D1, D2) each comprising a diffraction optical element, the optical system functions as a positive lens (such as a condenser lens) and a negative lens as a whole. These basic structures are similar to those of the eighteenth embodiment (FIG. 25).

By at least one of the first and the second reflecting optical elements (D1, D2) being a diffraction optical element and by bending light by the diffraction action when the light is reflected or transmitted as described above, a compact, lightweight and simple illuminating optical system can be easily obtained. The wavelength limitation function may be provided together with the lens function like in the eighteenth embodiment (FIG. 25). While it is desirable that the two reflecting optical elements (D1, D2) have different optical characteristics, they may have the same optical characteristic. The optical surfaces of the reflecting optical elements (D1, D2) are not limited to plane surfaces but may be curved surfaces. The reflecting optical elements (D1, D2) may be disposed so as to be inclined with respect to each other. The number of reflecting optical elements may be three or more. Polarization may be used. Moreover, the first and the second reflecting optical elements (D1, D2) may each be one comprising one element (for example, an HOE formed by multiple exposure) or may each be one comprising at least two elements superposed one on another or bonded together. The light beams of the wavelengths corresponding, for example, to R, G and B of an LED light source may be bent by using as the reflecting optical elements (D1, D2) diffraction optical elements having at least two different diffraction center wavelengths.

<<Embodiments of the Illuminating Optical System (FIGS. 29 to 31); the Number of Reflecting Optical Elements is Two (with a Color Matching Function)>>

Figure 29:
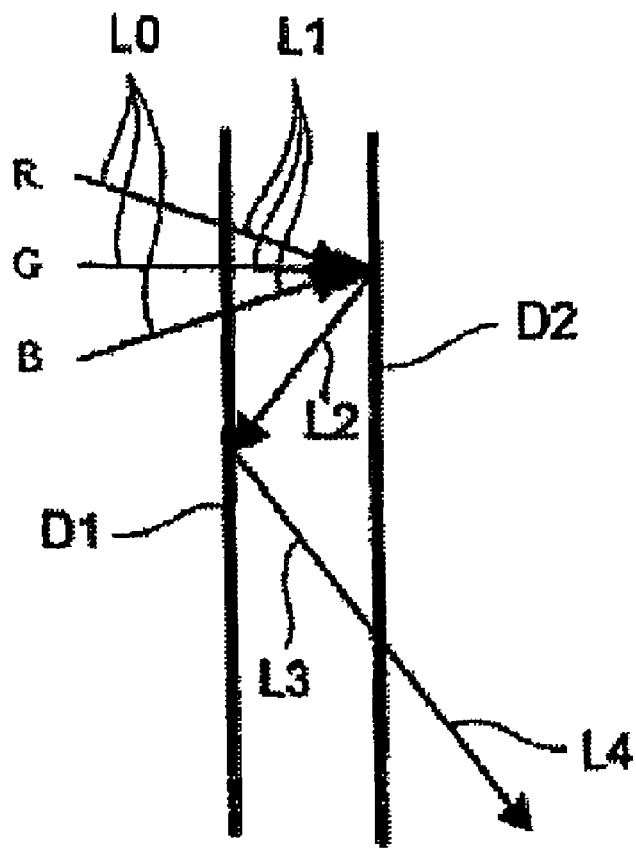
FIG. 29 is an optical structure view showing the schematic structure of a twenty-first embodiment.
Figure 30:
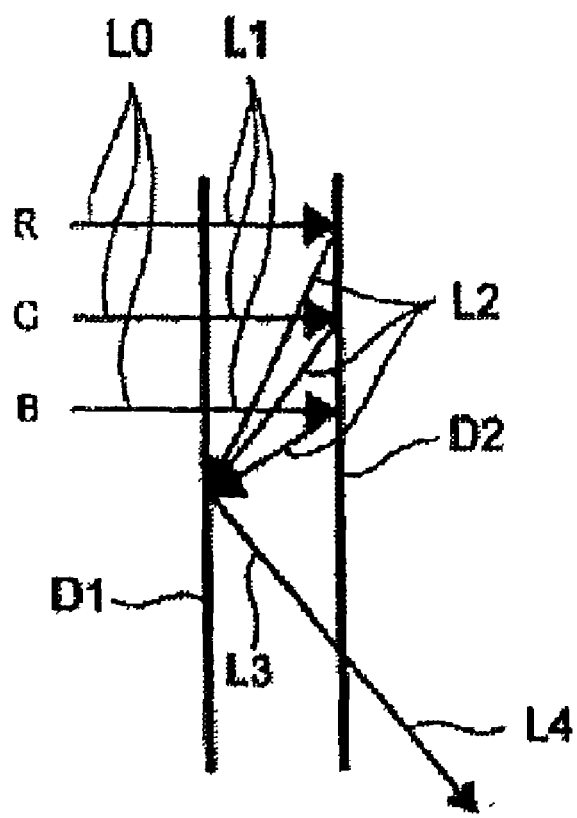
FIG. 30 is an optical structure view showing the schematic structure of a twenty-second embodiment.
Figure 31:
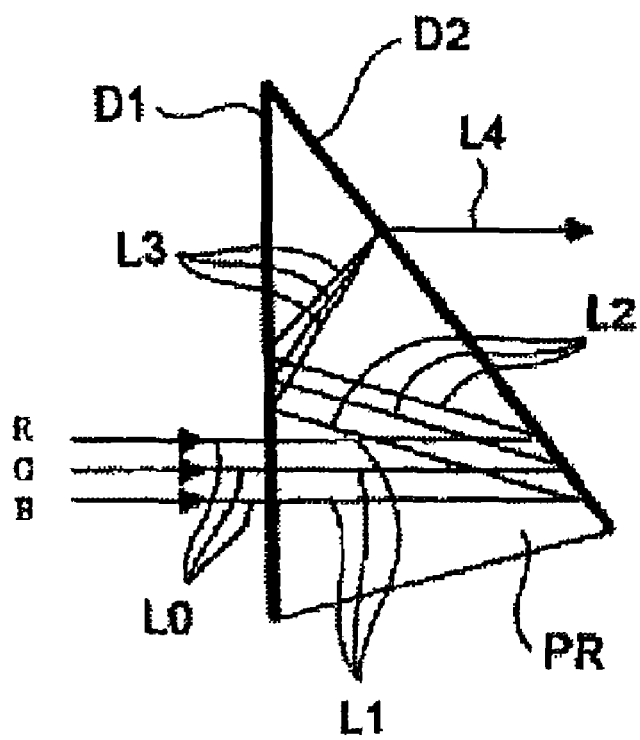
FIG. 31 is an optical structure view showing the schematic structure of a twenty-third embodiment.

FIGS. 29 to 31 show the optical structures and the optical paths of a twenty-first to a twenty-third embodiment. The twenty-first embodiment is characterized in that the second reflecting optical element (D2) has an RGB color matching function. The twenty-second embodiment is characterized in that the first and the second reflecting optical elements (D1, D2) have an RGB color matching function. The twenty-third embodiment is characterized in that the first and the second reflecting optical elements (D1, D2) bonded to both surfaces of a wedge prism (PR) have an RGB color matching function.

In the illuminating optical systems of the twenty-first to the twenty-third embodiments, the optical path is set so that the incident light beams (L0) of R, G and B are transmitted by the first reflecting optical element (D1), the transmitted light beams (L1) are reflected by the second reflecting optical element (D2), the reflected light beams (L2) are reflected by the first reflecting optical element (D1) and then, the reflected light beams (L3) are transmitted by the second reflecting optical element (D2) so that the transmitted light beams (L4) exit. By the diffraction actions of the first and the second reflecting optical elements (D1, D2) each comprising a diffraction optical element, color matching of R, G and B is performed. By this color matching function, color matching can be performed by bending light so that the virtual image positions of the illuminating light sources of R, G and B substantially coincide with one another. Moreover, according to the twenty-third embodiment in which color matching is performed by the first and the second reflecting optical elements (D1, D2) bonded to both surfaces of the wedge prism (PR), since the shift among the light beams can be corrected by the chromatic dispersion action of the wedge prism (PR), color matching is more easily performed.

By at least one of the first and the second reflecting optical elements (D1, D2) being a diffraction optical element and by performing color matching by bending light by the diffraction action when the light is reflected or transmitted as described above, a compact, lightweight and simple illuminating optical system can be easily obtained. The wavelength limitation function may be provided together with the color matching function. While it is desirable that the two reflecting optical elements (D1, D2) have different optical characteristics, they may have the same optical characteristic. The optical surfaces of the reflecting optical elements (D1, D2) are not limited to plane surfaces but may be curved surfaces. The reflecting optical elements (D1, D2) may be disposed so as to be inclined with respect to each other. The number of reflecting optical elements may be three or more. Polarization may be used. Moreover, the first and the second reflecting optical elements (D1, D2) may each be one comprising one element (for example, an HOE formed by multiple exposure) or may each be one comprising at least two elements superposed one on another or bonded together. Color matching may be performed by bending the light beams of the wavelengths corresponding, for example, to R, G and B of an LED light source by using as the reflecting optical elements (D1, D2) diffraction optical elements having at least two different diffraction center wavelengths.

<<Embodiment of the Illuminating Optical System (FIG. 32); the Number of Reflecting Optical Elements is Two (with a Lens Function and a Color Matching Function)>>

Figure 32:
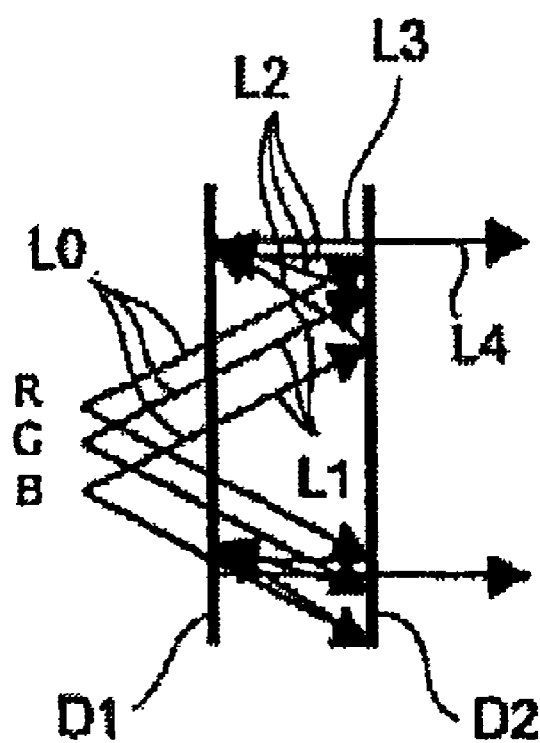
FIG. 32 is an optical structure view showing the schematic structure of a twenty-fourth embodiment.

FIG. 32 shows the optical structure and the optical path of the twenty-fourth embodiment. The twenty-fourth embodiment is characterized in that both the lens function of the nineteenth embodiment (FIG. 27) and the color matching function of the twenty-second embodiment (FIG. 30) are provided. The combination of the lens function and the color matching function is not limited to the one of the present embodiment, but the lens function of the twentieth embodiment (FIG. 28) may be combined or the color matching function of the twenty-first or the twenty-third embodiment (FIG. 29 or 31) may be combined.

<<Embodiment of the Beam Shaping Optical System (FIGS. 33 to 35); the Number of Reflecting Optical Systems is Two>>

Figure 33:
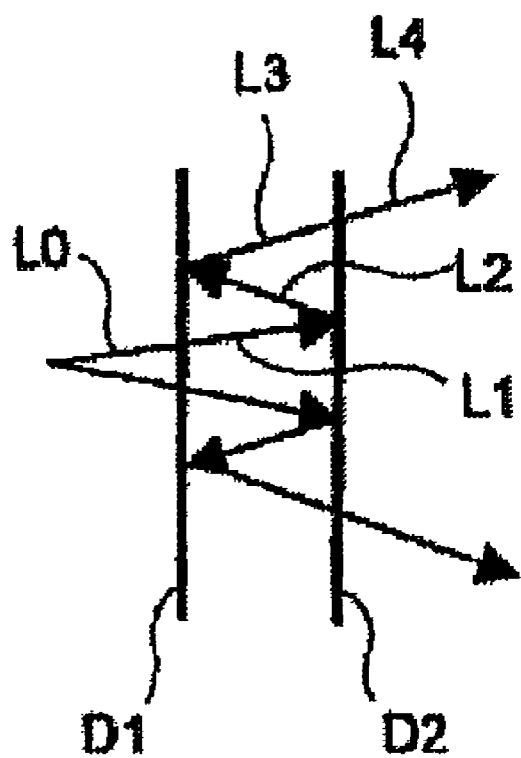
FIG. 33 is an optical structure view showing the schematic cross-sectional structure, in an x direction, of a twenty-fifth embodiment.
Figure 36:
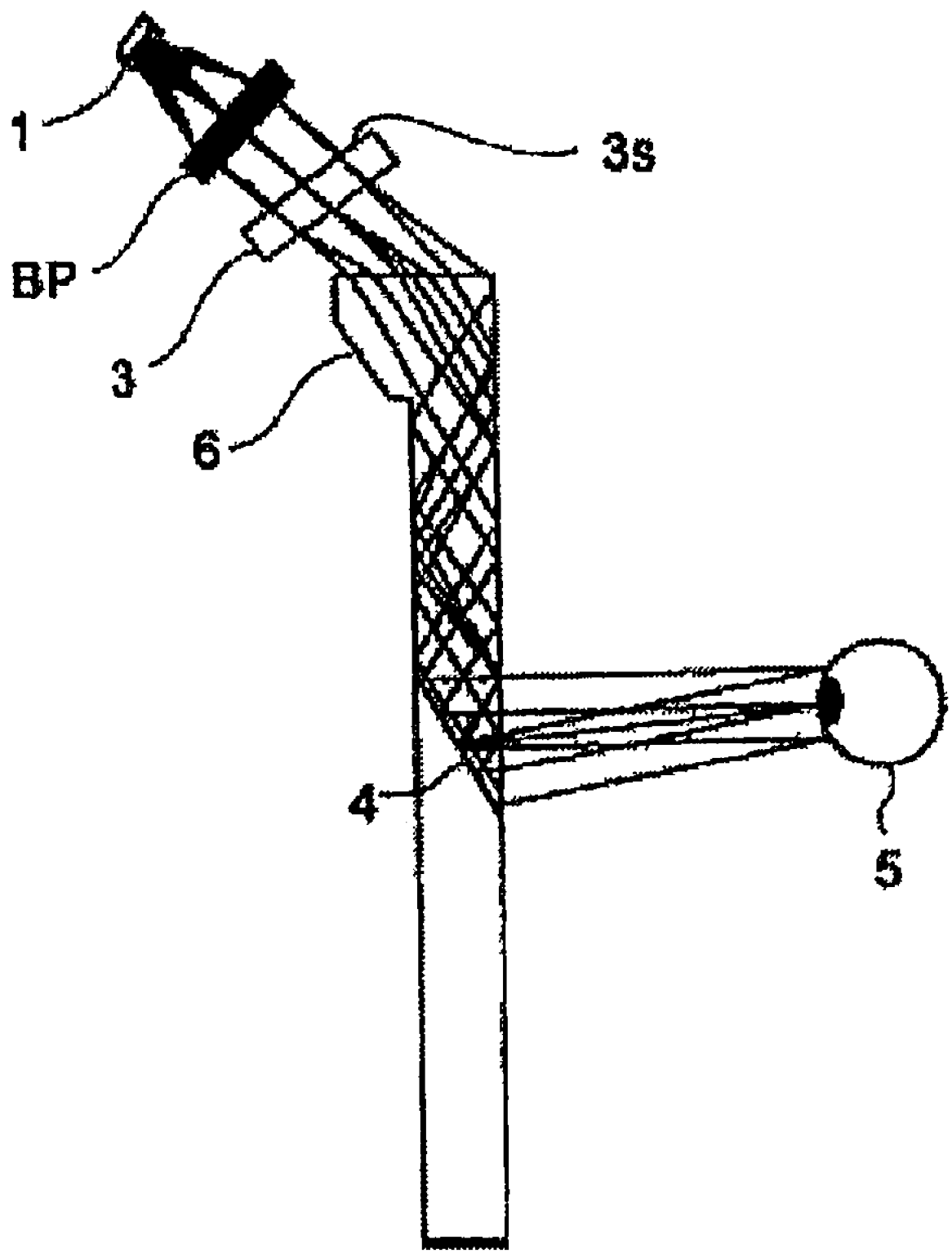
FIG. 36 is an optical structure view showing the schematic structure of a twenty-sixth embodiment.
Figure 37:
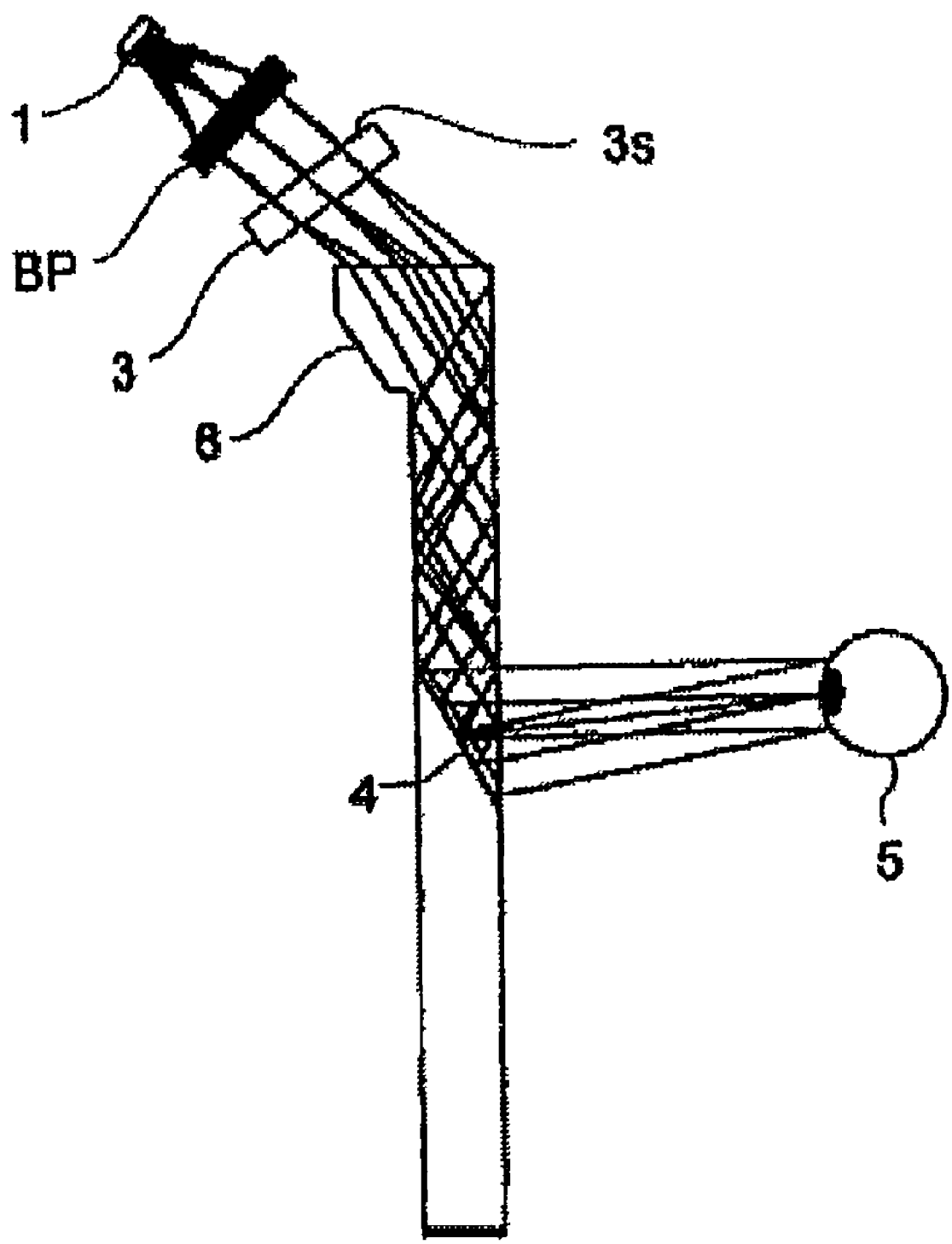
FIG. 37 is an optical structure view showing the schematic structure of a twenty-seventh embodiment.
Figure 38:
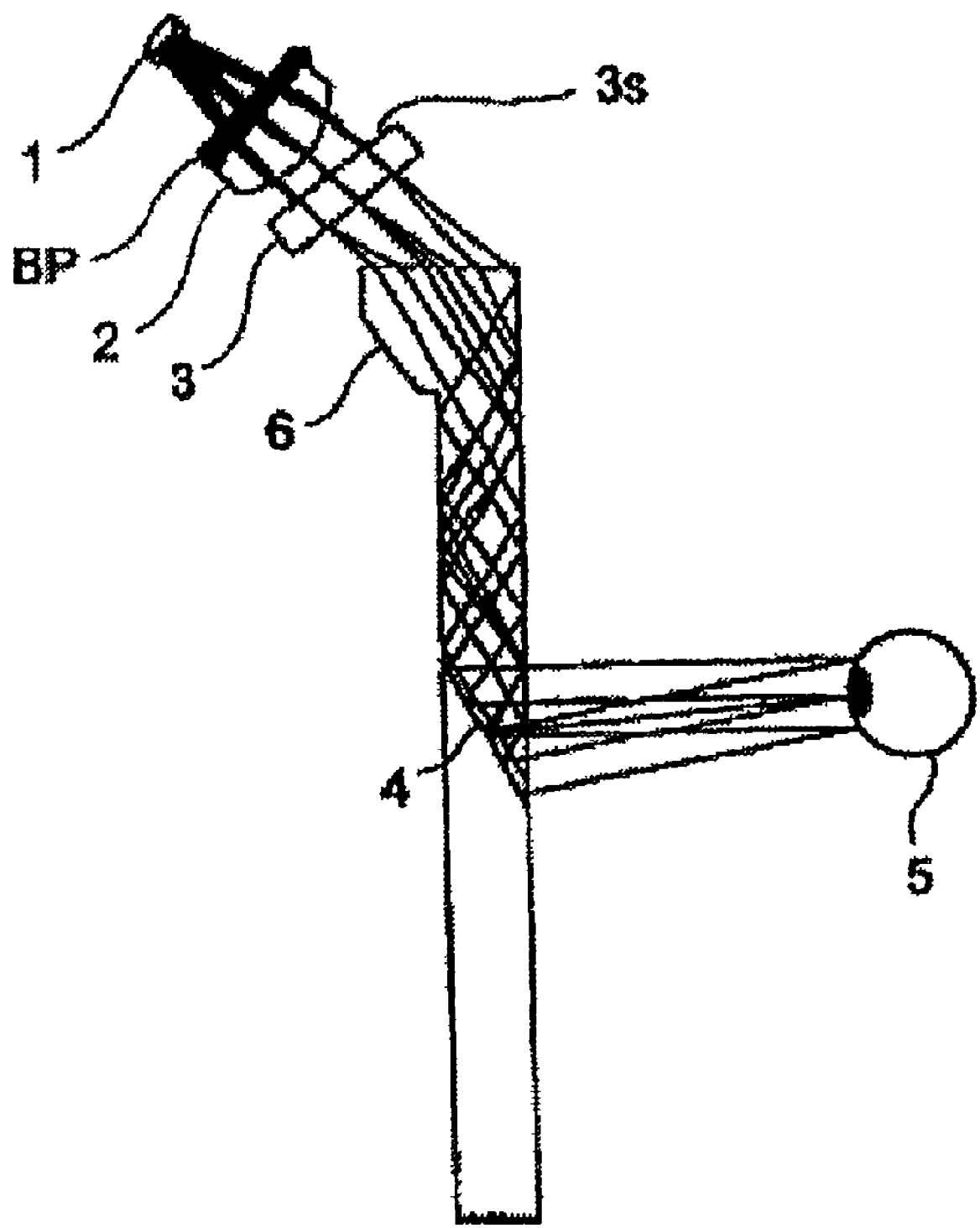
FIG. 38 is an optical structure view showing the schematic structure of a twenty-eighth embodiment.
Figure 39:
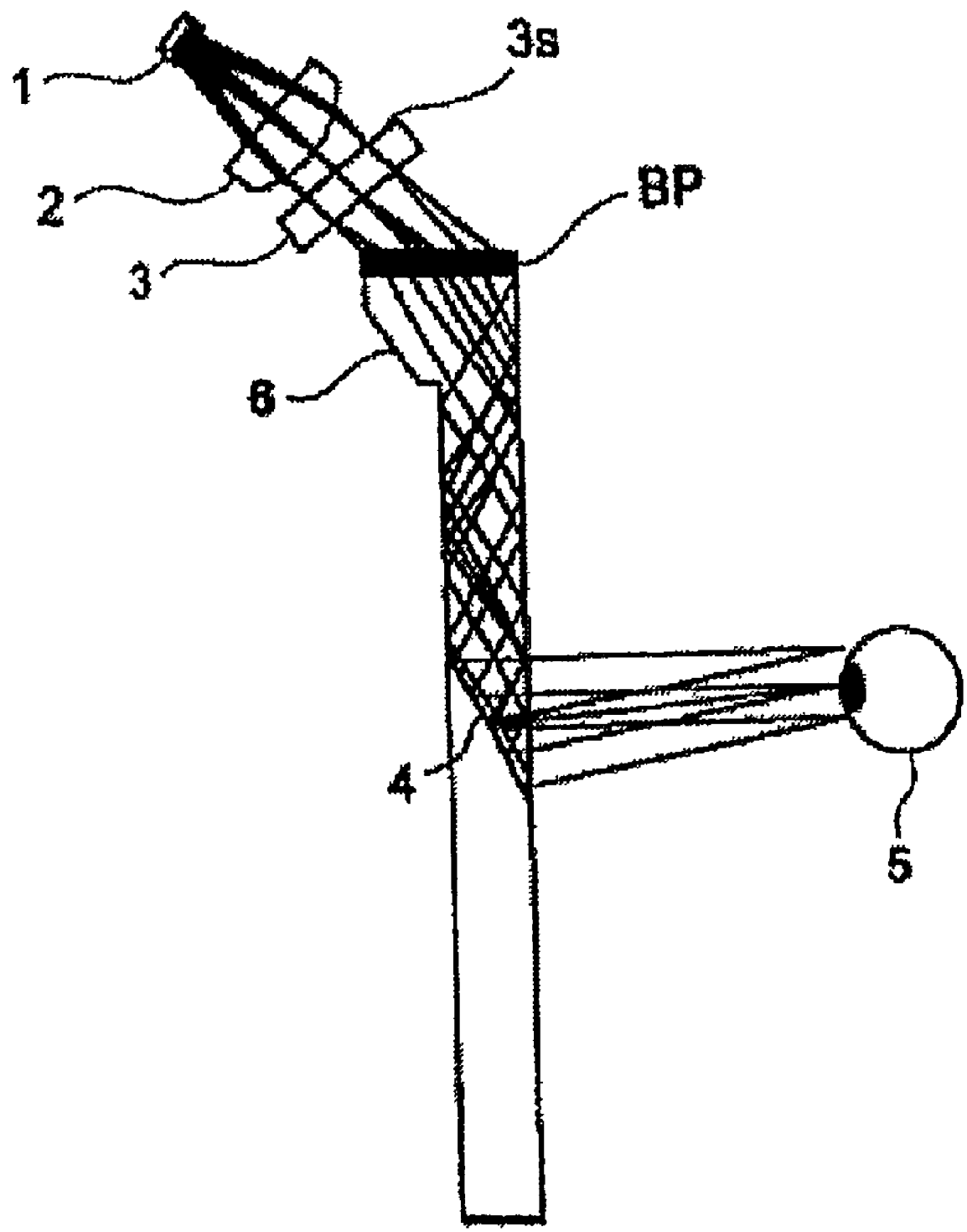
FIG. 39 is an optical structure view showing the schematic structure of a twenty-ninth embodiment.
Figure 40:
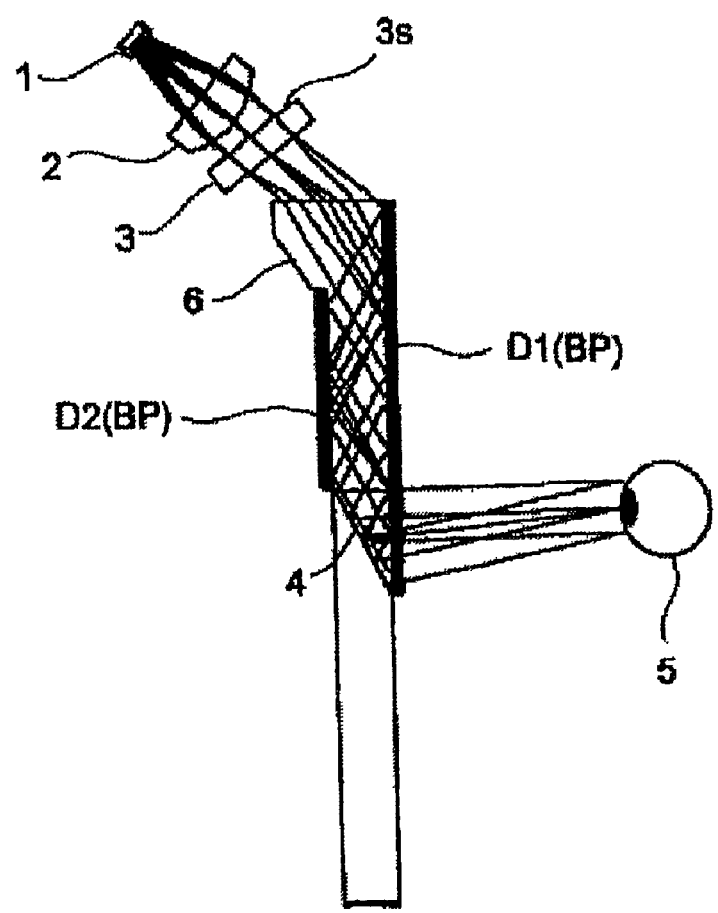
FIG. 40 is an optical structure view showing the schematic structure of a thirtieth embodiment.

FIGS. 33 and 34 show optical cross-sectional structures and the optical paths, in an x direction (minor axis direction) and in a y direction (major axis direction), of a twenty-fifth embodiment, respectively. FIGS. 35(A) and 35(B) show beam shapes (PN1, PN2) before and after shaping, respectively. The twenty-fifth embodiment is characterized in that different optical powers are provided in the x and the y directions. That is, the beam shaping optical system of the present embodiment is an anamorphic optical system having different optical powers in the x and the y directions, and the beam diameter is increased in the x direction by the negative optical power and is reduced in the y direction in the positive optical power. Therefore, an elliptical beam (PN1) emanating from a laser light source (s, such as a semiconductor laser) as shown in FIG. 35(A) is shaped into a circular beam (PN2) as shown in FIG. 35(B).

In the beam shaping optical system of the twenty-fifth embodiment, the optical path is set so that the incident light beam (L0) is transmitted by the first reflecting optical element (D1), the transmitted light beam (L1) is reflected by the second reflecting optical element (D2), the reflected light beam (L2) is reflected by the first reflecting optical element (D1) and then, the reflected light beam (L3) is transmitted by the second reflecting optical element (D2) so that the transmitted light beam (L4) exits, and when light is reflected by the reflecting optical elements (D1, D2) each comprising a diffraction optical element, the cross-sectional shape of the beam is changed by the diffraction action. By at least one of the first and the second reflecting optical systems (D1, D2) being a diffraction optical element and by changing the cross-sectional shape of the beam by the diffraction action when the light is reflected or transmitted as described above, a compact, lightweight and simple beam shaping optical system can be easily obtained. The first and the second reflecting optical elements (D1, D2) may each be one comprising one element (for example, an HOE formed by multiple exposure) or may each be one comprising at least two elements superposed one on another or bonded together (that is, one where the elements are disposed so that the optical powers in the x and the y directions are in an anamorphic relationship).

<<Embodiments of the Image Display Apparatus (FIGS. 36 to 40)>>

FIGS. 36 to 40 show the optical structures and the optical paths of a twenty-sixth to a thirtieth embodiment. In FIGS. 36 to 40, reference number 1 represents an LED, reference number 2 represents a condenser lens for illumination, reference number 3 represents a transmissive LCD, reference number 4 represents a holographic magnifying optical system, reference number 5 represents the viewer's eye, reference number 6 represents a prism, and BP represents a band-pass filter (BP) corresponding to the first to the eighteenth embodiments. The LED (1) is an illuminating light source emitting light for illuminating the display screen (3s) of the LCD (3). The condenser lens (2) is a collimator lens collimating the light from the LED (1). The LCD (3) is a transmissive spatially modulating element displaying two-dimensional images on the display screen (3s). Since the LCD (3) is a nonradiative display element, the two-dimensional images are made viewable by the display screen (3s) being illuminated with the illumination light from the LED (1), and the holographic magnifying optical element (4), serving as an eyepiece optical system, projects the two-dimensional images onto the viewer's eye so as to be magnified.

The twenty-sixth to the thirtieth embodiments are each characterized by the position of the band-pass filter (BP) on the optical path. In the twenty-sixth embodiment (FIG. 36), the band-pass filter (BP) is interposed between the condenser lens (2) and the LCD (3). In the twenty-seventh embodiment (FIG. 37), the band-pass filter (BP) is interposed between the LED (1) and the LCD (3). The band-pass filter (BP) used in the twenty-seventh embodiment (FIG. 37) has a condenser lens function, and corresponds to the illuminating optical system of the nineteenth embodiment (FIG. 27). Therefore, the condenser lens (2) is unnecessary. In the twenty-eighth embodiment (FIG. 38), the band-pass filter (BP) is interposed between the LED (1) and the condenser lens (2). In the twenty-ninth embodiment (FIG. 39), the band-pass filter (BP) is interposed between the LCD (3), and the prism (6) and the holographic magnifying optical element (4). In the thirtieth embodiment (FIG. 40), the band-pass filter (BP) is disposed on the prism (6) between the LCD (3) and the holographic magnifying optical element (4). At the first reflecting optical element (D1), reflection is performed twice and transmission is performed once, and at the second reflecting optical element (D2), reflection and transmission are each performed once. The band-pass effect is obtained by performing the wavelength limitation at one of the reflections and the transmissions.

By using the band-pass filter (BP) like in the twenty-sixth to the thirtieth embodiments, a sharp wavelength distribution with a narrow wavelength width is obtained, so that high-quality images can be displayed with an inexpensive, compact, lightweight and simple structure. Moreover, by using the band-pass filter (BP), the chromatic aberration of the diffracted light can be appropriately reduced by the holographic magnifying optical element (4).

Figure 41:
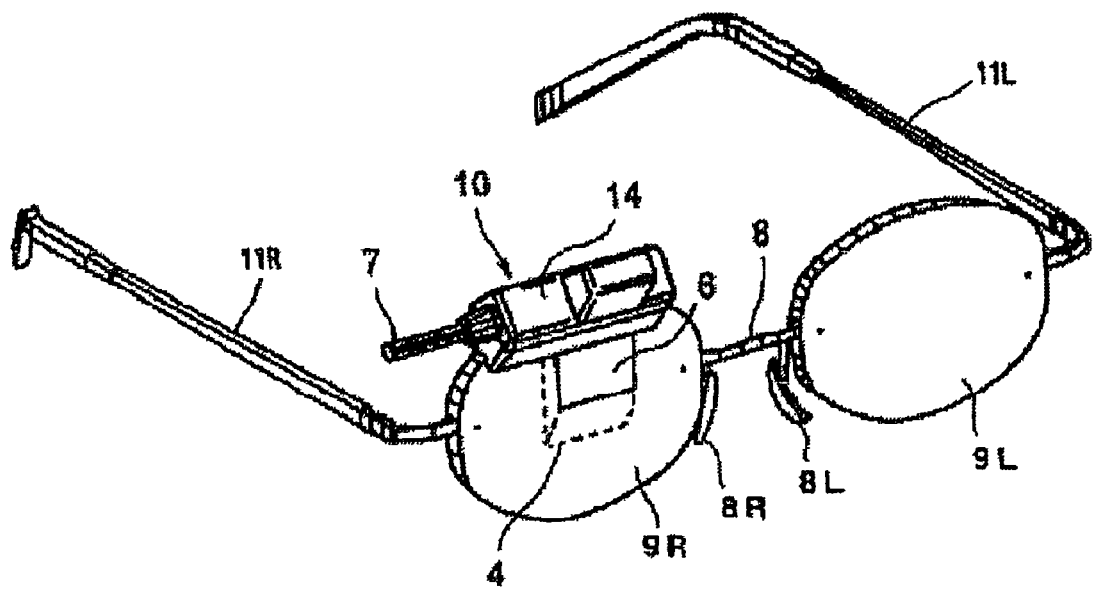
FIG. 41 is a perspective view showing the schematic external structure where any of the embodiments of the present invention is applied to an eyeglass-type image display apparatus.

FIG. 41 shows an example using the band-pass filter (BP) of the present invention for an eyeglass-type image display apparatus. In FIG. 41, reference number 4 represents a holographic magnifying optical element, reference number 6 represents a prism, reference number 7 represents a cable, reference number 8 represents a bridge, reference numbers 8R and 8L represent nose pads, reference numbers 9R and 9L represent lenses, reference number 10 represents a display, reference numbers 11R and 11L represent temples, and reference number 14 represents a case. The prism (6) is imbedded in part of the lens (9R) for the right eye, and the display (10) displaying images is attached to an upper part of the prism (6). To the display (10), a power supply portion and the cable (7) for signal supply are connected. The display (10) is covered with the case 14, and the prism (6) is sandwiched by the prism (6). The LED (1), the condenser lens (2); the LCD (3) and the like are provided in the case (14). With this structure, a compact and lightweight image display apparatus can be structured.

The above-described first to thirtieth embodiments include inventions (j1 to j22) having the following structure:

As described above, according to the band-pass filter of the present invention, a sharp wavelength distribution is obtained and the band-pass filter is reduced in size and weight. According to the illuminating optical system of the embodiments, since light is bent by the diffraction action, the condenser lens function and the color matching function are obtained with a compact structure. According to the beam shaping optical system of the present invention, since the cross-sectional shape of the beam is changed by the diffraction action, an excellent beam shaping function is obtained with a compact structure. By using the band-pass filter and the illuminating optical system of the embodiments, a compact and lightweight image display apparatus is realized that is capable of displaying high-quality images with an inexpensive and simple structure.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A band-pass filter comprising:
    a reflecting optical element having a fixed reflection angle selection region for wavelengths of a given region, and has an optical path such that reflection is first performed and transmission is subsequently performed at different incident angles at the reflecting optical element,
    wherein a wavelength distribution of an incident light beam is narrowed when the light beam is first reflected by the reflecting optical element, and the wavelength distribution of the incident light beam is cut when the light beam is subsequently transmitted by the reflecting optical element.

2. A band-pass filter as claimed in claim 1, wherein the reflecting optical element is a volume-phase holographic optical element, a multilayer film or a multilayer filter.

3. A band-pass filter comprising:
    a reflecting optical element for reflecting and transmitting an incident light beam as a function of wavelength and angle of incidence, the band-pass filter being configured such that an optical path of the incident light beam causes the incident light beam to be reflected at least once by the reflecting optical element at a first angle of incidence, and to be transmitted by the reflecting optical element at least once at a second angle of incidence, the second angle of incidence being different from the first angle of incidence,
    wherein a wavelength distribution of the incident light beam is substantially narrowed upon being reflected by the reflecting optical element and the wavelength distribution of the incident light beam is cut upon being transmitted by the reflecting optical element.

4. A band-pass filter as claimed in claim 3, wherein the reflecting optical element is selected from the group consisting of a volume-phase holographic optical element, a multilayer film, and a multilayer filter.

5. A band-pass filter as claimed in claim 3, further comprising a mirror for reflecting the incident light beam, the band-pass filter being configured such that the optical path of the incident light beam causes the incident light beam to be reflected by the mirror after the incident light beam is one of reflected or transmitted by the reflecting optical element.

6. A band-pass filter comprising:
    a reflecting optical element for reflecting and transmitting an incident light beam as a function of wavelength and angle of incidence, the band-pass filter being configured such that an optical path of the incident light beam causes the incident light beam to be reflected at least once by the reflecting optical element at a first angle of incidence, and to be transmitted by the reflecting optical element at least once at a second angle of incidence, the second angle of incidence being different from the first angle of incidence,
    wherein a wavelength region on a longer wavelength side of a wavelength distribution of the incident light beam is cut upon one of being reflected and transmitted by the reflecting optical element, and
    wherein a wavelength region on a shorter wavelength side of the wavelength distribution of the incident light beam is cut upon the other one of being reflected and transmitted by the reflecting optical element.

7. A band-pass filter as claimed in claim 6, wherein the reflecting optical element is selected from the group consisting of a volume-phase holographic optical element, a multilayer film, and a multilayer filter.

8. A band-pass filter as claimed in claim 6, further comprising a mirror for reflecting the incident light beam, the band-pass filter being configured such that the optical path of the incident light beam causes the incident light beam to be reflected by the mirror after the incident light beam is one of reflected or transmitted by the reflecting optical element.

9. A band-pass filter comprising:

a reflecting optical element having a fixed reflection angle selection region for wavelengths of a given region, and has an optical path such that transmission is first performed and reflection is subsequently performed at different incident angles at the reflecting optical element, wherein a wavelength distribution of an incident light beam is narrowed when the light beam is first transmitted by the reflecting optical element, and the wavelength distribution of the incident light beam is cut when the light beam is subsequently reflected by the reflecting optical element.

10. A band-pass filter as claimed in claim 9, wherein the reflecting optical element is a volume-phase holographic optical element, a multilayer film or a multilayer filter.

* * * * *